Oct. 24, 1972  E. F. YOST, JR  3,700,438
MULTISPECTRAL PHOTOGRAPHY
Filed Jan. 12, 1971  17 Sheets-Sheet 1

INVENTOR.
EDWARD F. YOST, JR.
BY
his ATTORNEYS

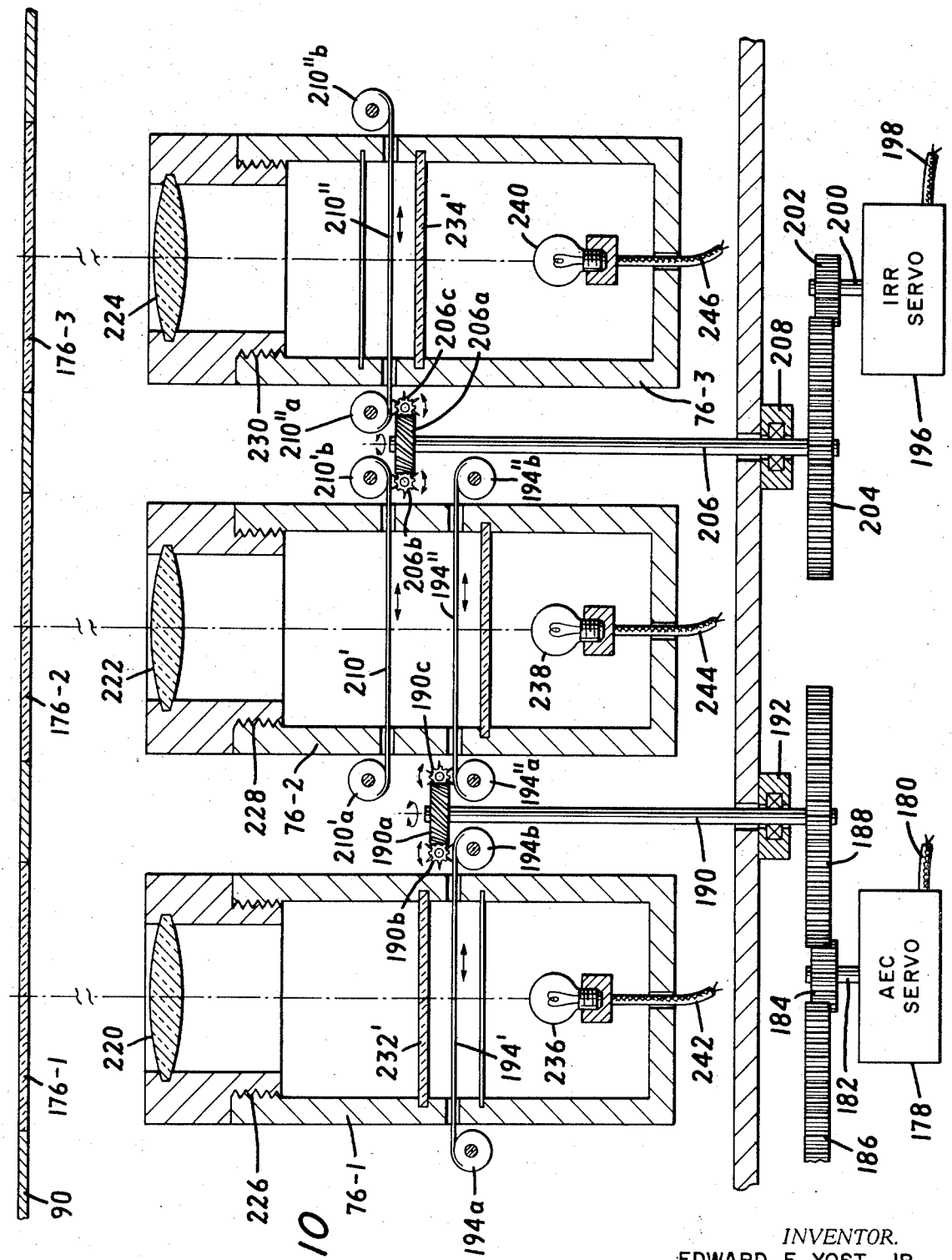

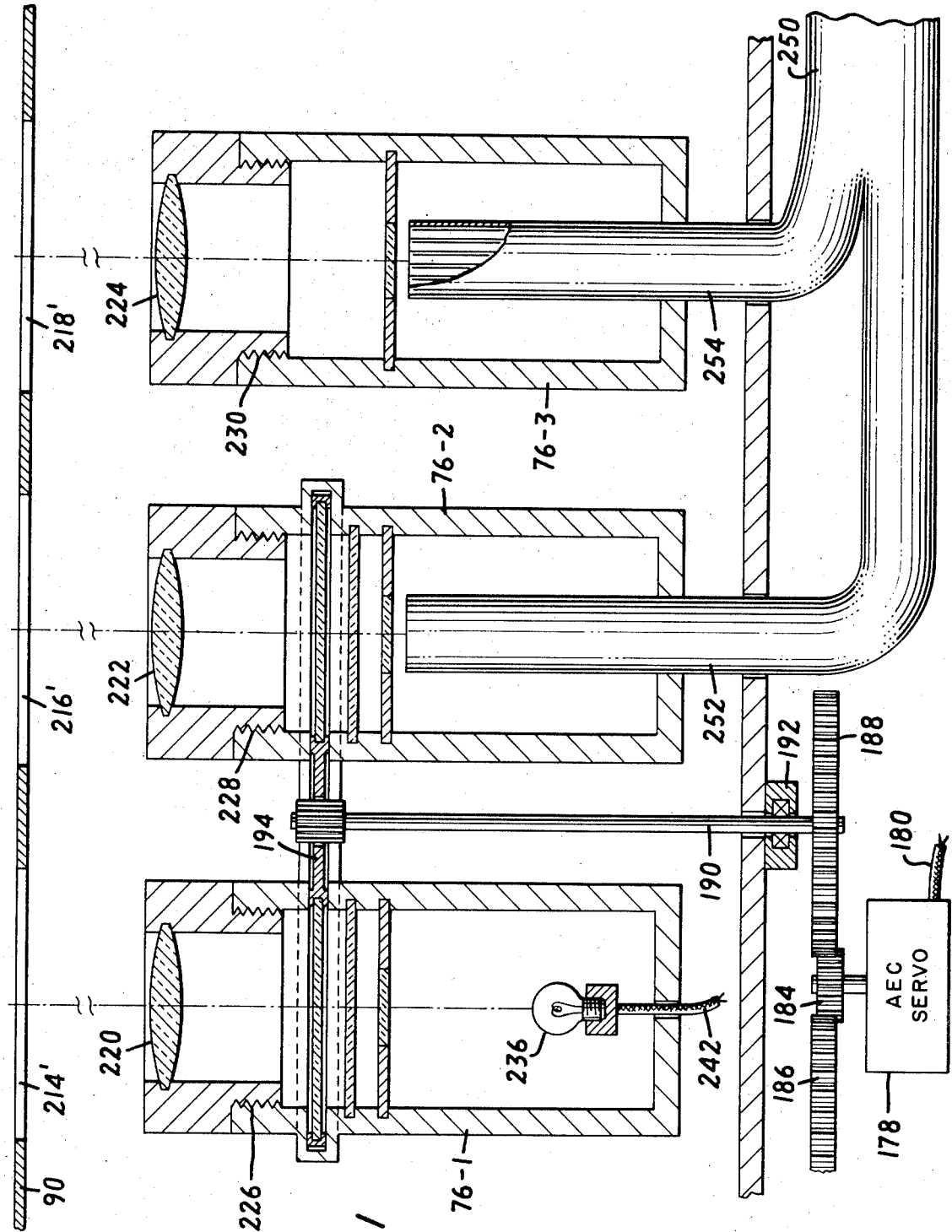

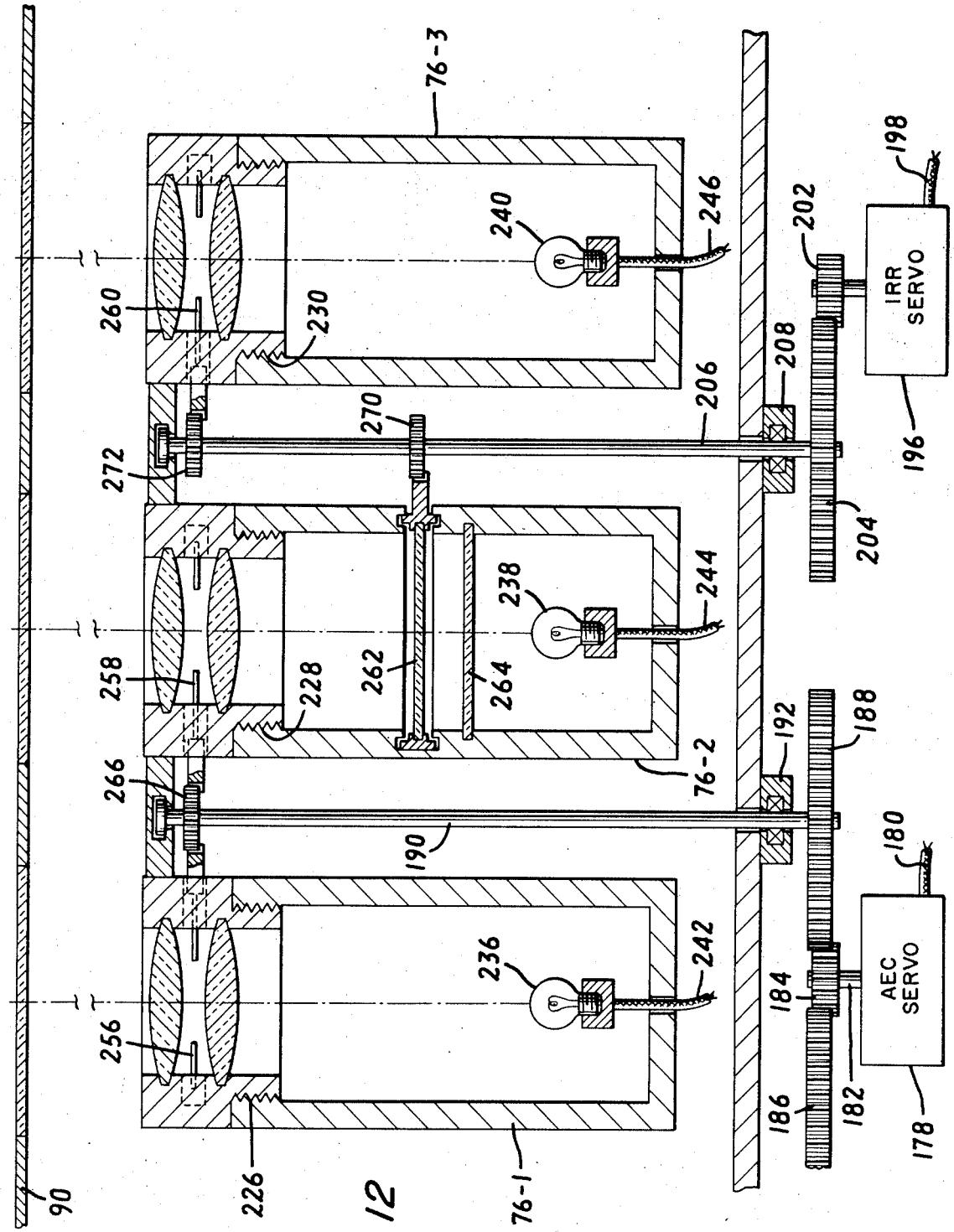

Oct. 24, 1972  E. F. YOST, JR  3,700,438
MULTISPECTRAL PHOTOGRAPHY
Filed Jan. 12, 1971  17 Sheets-Sheet 11
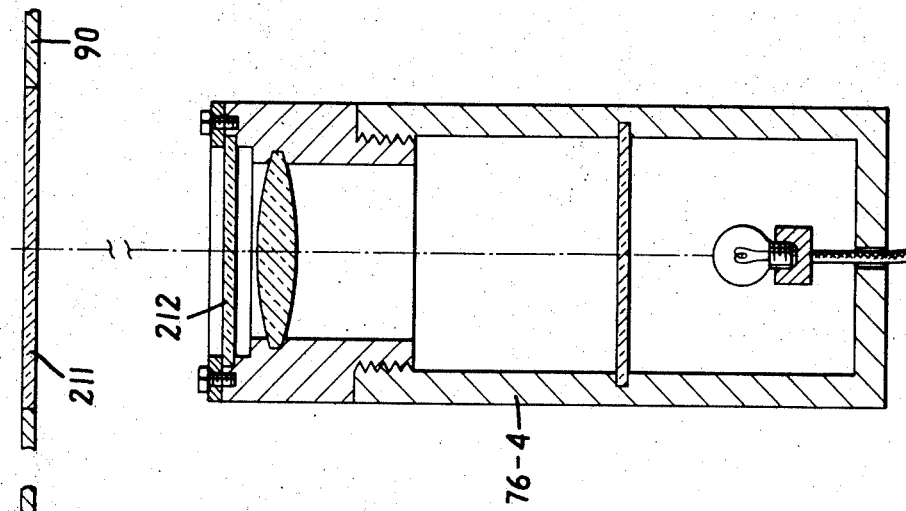
FIG. 13A
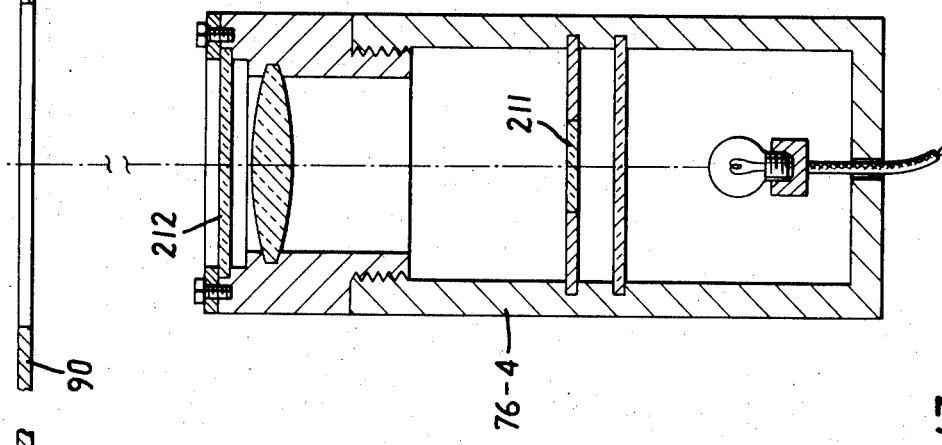
FIG. 13
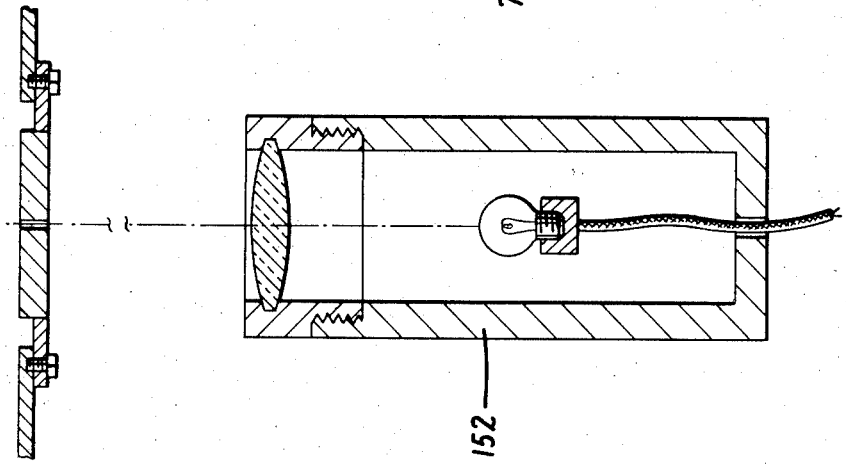
INVENTOR.
EDWARD F. YOST, JR.
BY
his ATTORNEYS

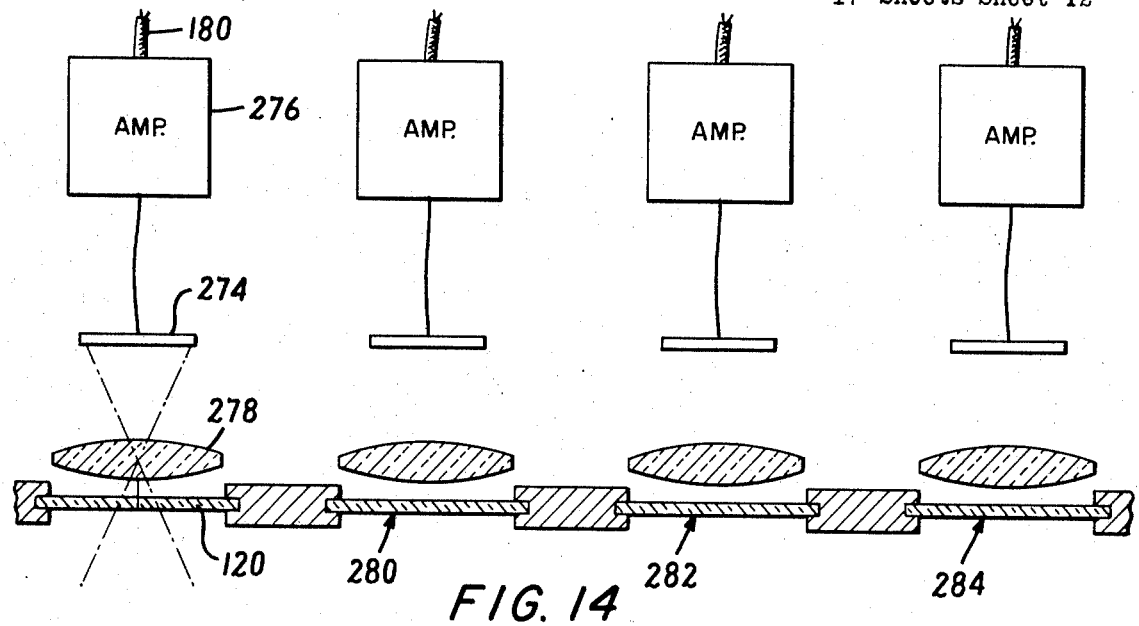
FIG. 14
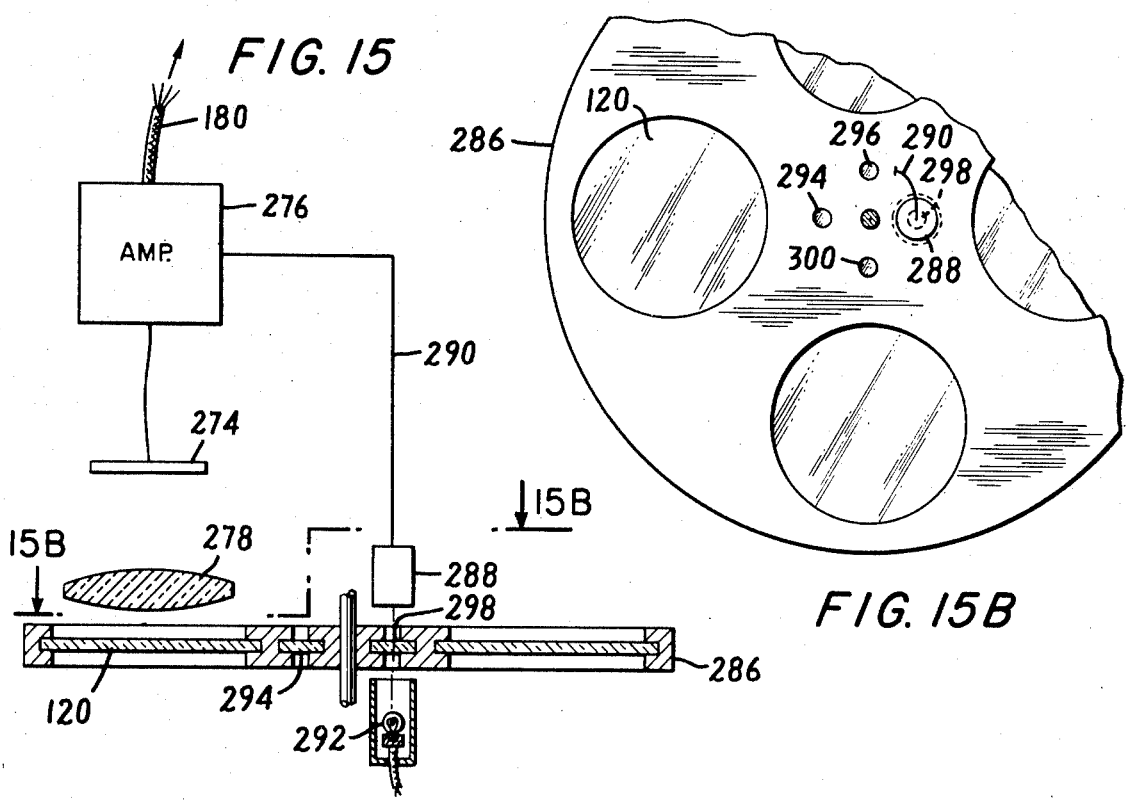
FIG. 15
FIG. 15B
FIG. 15C

Oct. 24, 1972  E. F. YOST, JR  3,700,438
MULTISPECTRAL PHOTOGRAPHY
Filed Jan. 12, 1971  17 Sheets-Sheet 16
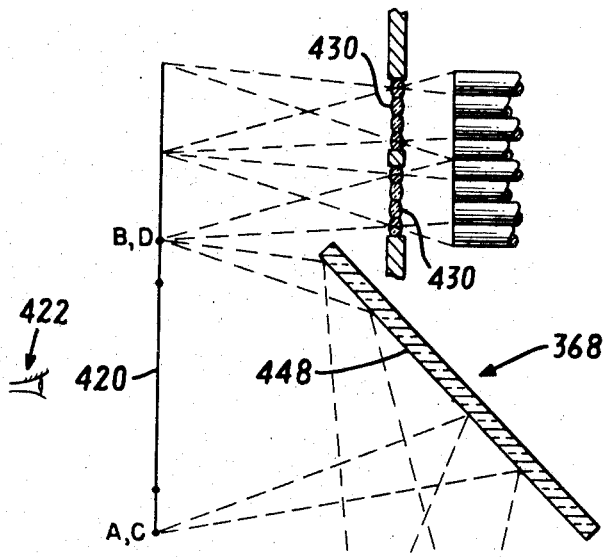
FIG. 23
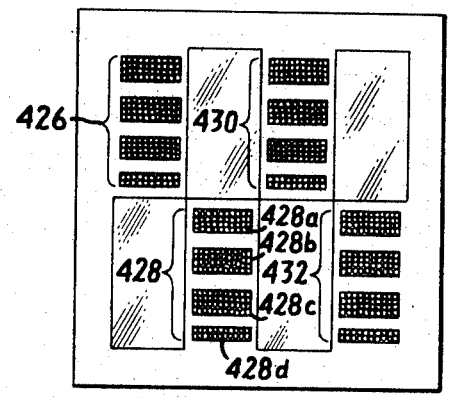
FIG. 23A
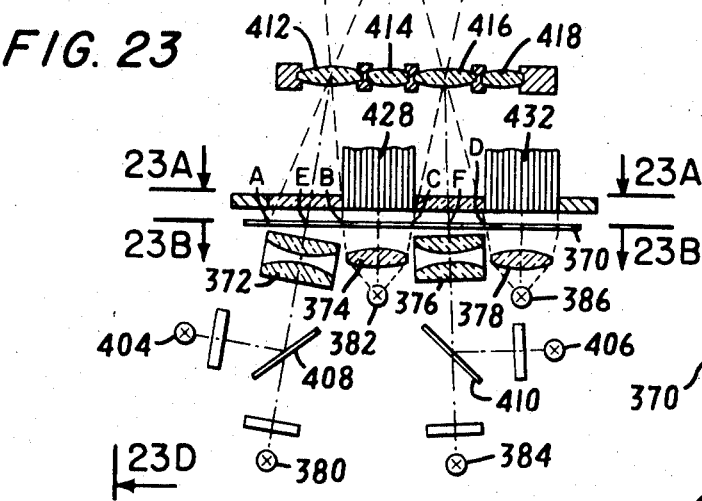
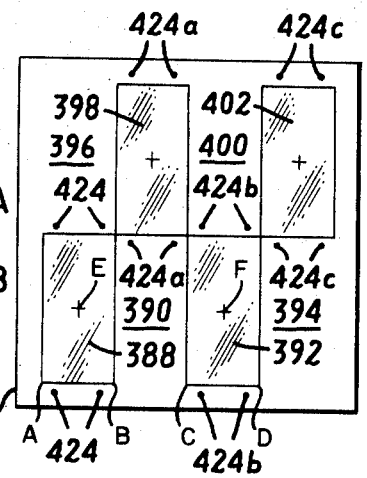
FIG. 23B
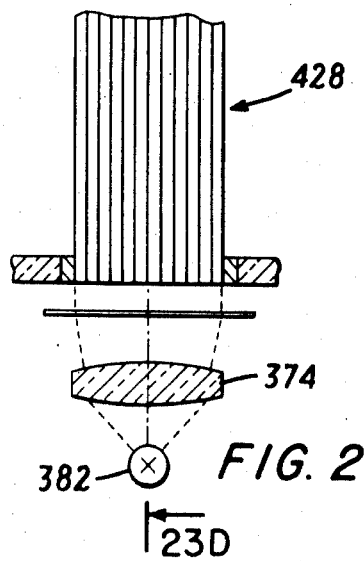
FIG. 23C
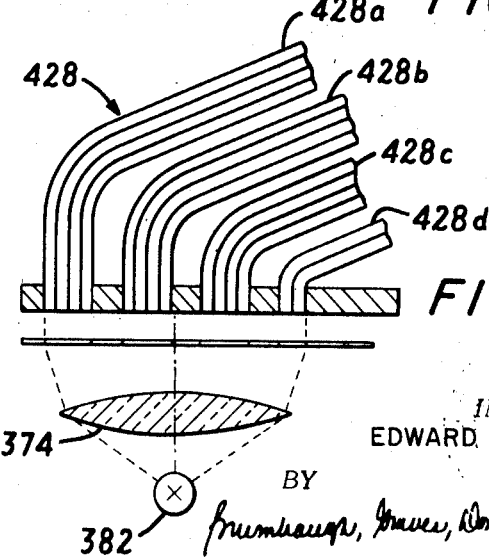
FIG. 23D
INVENTOR.
EDWARD F. YOST, JR.
BY
his ATTORNEYS Oct. 24, 1972  E. F. YOST, JR  3,700,438
MULTISPECTRAL PHOTOGRAPHY
Filed Jan. 12, 1971  17 Sheets-Sheet 17

INVENTOR.
EDWARD F. YOST, JR.
BY
his ATTORNEYS

United States Patent Office 3,700,438
Patented Oct. 24, 1972

3,700,438
MULITSPECTRAL PHOTOGRAPHY
Edward F. Yost, Jr., Northport, N.Y., assignor to Spectral Data Corporation, Hicksville, N.Y.
Filed Jan. 12, 1971 Ser. No. 105,839
Int. Cl. G03b *29/00;* G03c *7/00*
U.S. Cl. 96—2
6 Claims

ABSTRACT OF THE DISCLOSURE

A scene that has arbitrary spectral characteristics and that is illuminated by an illuminant of arbitrary spectral characteristics is photographed a plurality of times simultaneously on different areas of a strip of black-and-white film. Different regions of the electromagnetic spectrum are respectively employed in forming the several photographs. The exposures respectively associated with the photographs are adjusted so that each photograph is on a prescribed part of the characteristic curve of the film. Records of the intensity of the radiation from the scene in each of the spectral regions and of the intensity of the illuminant in each of the spectral regions are also formed. After development, the photographs are projected as images in exactly superimposed relation for viewing, and the brightnesses of the respective images are adjusted as a function of the records.

BACKGROUND OF THE INVENTION

This invention relates to multispectral photography and, more particularly, to novel and highly-effective multispectral photographic methods and apparatus facilitating the maximizing of the information that can be extracted from a plurality of photographs of a given scene made simultantously on different areas of one or more strips of black-and-white film employing different regions of the electromagnetic spectrum.

There are two particularly troublesome problems of multispectral photography that have heretofore resisted efforts to solve them.

The first relates to the effect of a change in the illuminant on the appearance of the scene. A given scene viewed successively under two illuminants of different spectral characteristics changes its appearance. If the scene is photographed in color or by multispectral photography under the two illuminants, the photographs made under one illuminant differ from those made under the other. In photographic reconnaissance, it is desirable to be able to distinguish apparent changes in a given scene photographed at different times (i.e., changes in the photographs that are due to changes in the illuminant) from "real" changes (i.e., changes in the photographs that are due to changes in the scene itself). One apparent change is diurnal: the midday sun, for example, is bright and has a relative preponderance of radiation at a short wavelength, whereas the early morning or late afternoon sun is less bright and has a relative preponderance of radiation at a longer wavelength. Other apparent changes are functions of the season and the weather. Still others result from a substitution of illuminants, as a substitution of one type of illuminating aerial flare for another. Real changes may result from stress of the vegetation caused by disease or lack of water, the emplacement of camouflage, the formation of frost, the erosion or tilling of soil, the planting of crops, and a host of other causes. Similarly, different scenes photographed under different illuminants, or parts of such scenes, may appear the same in photographs made at separate times under different illuminants, though in fact they differ in ways of interest such as the degree of stress of the vegetational cover, etc.

It is obviously of the utmost importance to be able to eliminate the effect of changes in the illuminant when interpreting multispectral photographs.

Such half-measures as noting the date and hour when the pictures are made and the state of the weather provide limited qualitative assistance but not a quantitative measure of the degree of "error" or departure from some standard illuminant.

The second problem is that the exposures associated with the sveral photographs as they are taken and the brightnesses of the several images as they are projected after development in superimposed relation to form a composite image for viewing are not optimum.

For example, in taking the pictures in a very simple system, a single measurement of scene brightness may be made. This measure is a function of the intensities of radiation from the scene in different regions of the electromagnetic spectrum. If the regions employed in the multispectral photography are blue, green, red and infrared, the radiation from the scene may be of relatively high intensity in the green and infrared regions, for example, and of relatively low intensity in the blue and red regions. An average intensity reading employed to adjust the exposures associated with all of the photographs would therefore underexpose the photographs made employing radiation in the blue and red regions of the spectrum and overexpose the photographs made employing the green and infrared regions of the spectrum. Thus, conceivably none of the pictures is formed on the straight-line part of the characteristic curve of the film, which is the part of the curve giving maximum contrast and therefore maximum information per unit area.

In a more complex system, a separate measure of intensity can be made in each region of the spectrum to be employed in forming the photographs. On the one hand this results in forming each picture on the straight-line part of the characteristic curve of the film. However, the colors in the composite image formed upon projection of the photographs after development in superimposed relation for viewing tend to be desaturated where the same filters are used for projection as for taking the pictures and where the projection intensities for each picture are equal. Moreover, there is no way known in the prior art for reliably correcting the projection intensities so that the colors in the composite image duplicate those in the scene. This detracts from the utility of multispectral photography as an analytical tool.

SUMMARY OF THE INVENTION

An object of the invention is to remedy the problems of the prior art outlined above and, in particular, to make it possible to distinguish "real" phenomena from "apparent" phenomena in a photographed scene and to provide both for the taking of each of a set of multispectral photographs on a prescribed part of the characteristic curve of the film and for the projection of the photographs in true color or in a false color that departs from true color in a predetermined way.

The foregoing and other objects are attained in accordance with the invention by forming, on black-and-white film and respectively employing different regions of the electromagnetic spectrum, a plurality of photographs of a scene that has arbitrary spectral characteristics and that is illuminated by an illuminant of arbitrary spectral characteristics and adjusting the exposures respectively associated with the photographs so that each of the photographs is on a prescribed part of the characteristic curve of the film. At the same time, records are formed of the intensity of the radiation from the scene in each of the spectral regions and of the intensity of the illuminant in each of the spectral regions. The photographs after development are projected in superimposed relation to form a composite image for viewing, and the brightnesses of the respective projected images are adjusted as a function of the records.

Usually, it is desirable that the exposures be adjusted so that each of the photographs is on the same part of the characteristic curve of the film and particularly the straight-line part of the characteristic curve of the film.

BRIEF DESCRIPTION OF THE DRAWING

An understanding of additional aspects of the invention can be gained from a consideration of the following detailed description of several representative embodiments thereof, in conjunction with the accompanying figures of the drawing, wherein:

FIG. 7A is a schematic illustration of step-wedge negatives corresponding to the scene of FIG. 7 as photographed under the illuminant of FIG. 7;

FIG. 7B is a schematic illustration of positives produced from the negatives of FIG. 7A;

FIG. 7C is a schematic illustration of composite color images derived by simultaneous projection of the positives of FIG. 7B;

FIG. 7D is a schematic illustration of the corrections that must be made to the composite images of FIG. 7C in order to produce white images and that, if made to the projections of the photographs of the scene, result in a composite image in true color;

FIGS. 8, 8A, 8B, 8C and 8D are schematic illustrations corresponding, respectively, to FIGS. 7, 7A, 7B, 7C and 7D, but showing the scene of FIG. 7 illuminated under a different hypothetical illuminant;

FIG. 10 is a schematic view in sectional elevation of an alternate embodiment of the portion of the apparatus shown in FIG. 6;

FIG. 11 is a schematic view in sectional elevation of another embodiment of the portion of the apparatus shown in FIG. 6;

FIG. 12 is a schematic view in sectional elevation of another embodiment of the portion of the apparatus shown in FIG. 6;

FIG. 13 is a schematic view in sectional elevation of still another embodiment of a portion of the invention, showing a fiducial illuminating system and another way of implementing the standard invariant processing step wedge;

FIG. 13A is a schematic view in sectional elevation of another embodiment of the standard invariant processing step wedge;

FIG. 14 is a schematic illustration of an automatic exposure control associated with each of four spectral bands in accordance with the invention;

FIG. 15 is an alternate embodiment of an exposure control in accordance with the invention;

FIG. 15B is a plan view of the apparatus of FIG. 15, taken along the line 15B—15B of FIG. 15 and looking in the direction of the arrows;

FIG. 15C is a graph of detector current as a function of time produced by the apparatus of FIGS. 15 and 15B;

FIG. 23 is a schematic view in side elevation of a multispectral viewer for displaying a composite image in accordance with the invention;

FIG. 23A is a view taken along the line 23A—23A of FIG. 23 and looking in the direction of the arrows;

FIG. 23B is a view taken along the line 23B—23B of FIG. 23 and looking in the direction of the arrows;

FIG. 23C is a schematic view in elevation of a portion of the apparatus of FIG. 23, on an enlarged scale;

FIG. 23D is a view taken along the line 23D—23D of FIG. 23C and looking in the direction of the arrows;

DESCRIPTION OF THE PREFERRED EMBODIMENTS

The accurate operation of a four-lens multispectral camera incorporating automatic exposure control results (within the dynamic range of lens aperture and film exposure latitude) in an average grey value for the scene when viewed in additive color. (The concept of average grey value relates to a ground object whose spectral reflectance value is the average value for the scene. Such a ground object may or may not explicitly exist in any particular scene.) In each band, compensation is made for variations in the energy reflected by the scene. The energy is sensed by automatic exposure control units that in turn open and close the several lens apertures of the multispectral camera. In accordance with the present invention, multispectral photographs are taken accurately using automatic exposure control of each lens. At the same time, compensation is made for large variations in the spectral distribution of illuminant falling on the scene.

Ideally, operation of an automatic exposure control device would place the average grey value in each spectral band at the same point on the straight-line part of the film characteristic curve. This would be true regardless of the spectral distribution of the scene illuminant. Additive color viewing of such an image display results in a highly desaturated (virtually colorless or achromatic) image. The automatic exposure control compensates for many of the nonlinearities in the photographic process by putting all images in each spectral band in the straight-line part of the characteristic curve. This removes virtually all differences between bands so that the presentation by the additive color viewer is virtually devoid of color.

In accordance with the present invention, one compensates for variations in the solar illuminant of a scene reflecting a given and fixed amount of energy in each camera band and also for a constant illuminant of a scene of varying reflectance in each camera band. This is accomplished by the use of automatic exposure control and means facilitating accurate multispectral color rendition of a scene for all of the conditions described above. Heretofore, this has been impossible.

Figure 1:
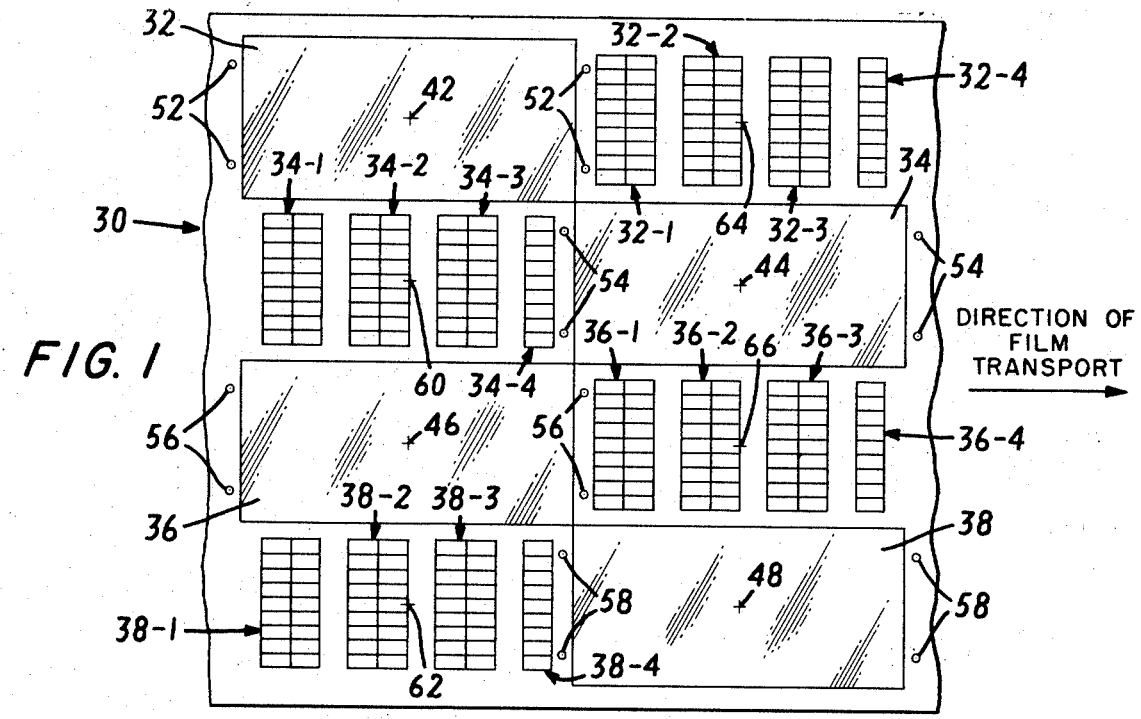
FIG. 1 is a schematic plan view of a strip of photographic film showing a preferred format for multispectral photographs and related records in accordance with the invention.

FIG. 1 shows a film strip 30 including four spectral photographic records 32, 34, 36 and 38 in identical positions with respect to coordinate systems through principal points 42, 44, 46 and 48, the coordinate axes being parallel to the edge of the film 30. Associated with each photograph 32, 34, 36 and 38 is a set of four fiducials 52, 54, 56 and 58, respectively, which are accurately positioned with respect to the coordinate systems through the principal points 42, 44, 46 and 48 of each photograph. All four photographs have their associated fiducials in exactly the same coordinate positions with respect to their respective principal points.

Four sets of grey-scale step wedges are associated with each photograph. Sets of wedges 32–1, 32–2, 32–3 and 32–4 are associated with the photograph 32; sets of wedges 34–1, 34–2, 34–3 and 34–4 are associated with the photograph 34; sets of wedges 36–1, 36–2, 36–3 and 36–4 are associated with the photograph 36; and sets of wedges 38–1, 38–2, 38–3 and 38–4 are associated with the photograph 38.

Figure 4:
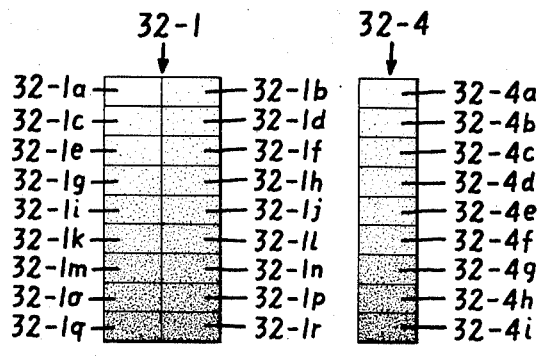
FIG. 4 is a schematic plan view of step wedges in accordance with the invention as they are projected onto the film.

The sets of step wedges comprise a plurality of steps of which the densities form a progression from virtually transparent to virtually opaque, as illustrated in FIG. 4. While there is a wide latitude in the choice of the number of steps, three of the sets of step wedges associated with each photograph may conveniently comprise 18 steps and the fourth, which for reasons explained below need not have as great a range, may comprise nine. The step wedges 32–1 shown in FIGS. 1 and 4 are illustrated as comprising steps 32–1a through 32–1r of progressively increasing density, and the step wedges 32–4 shown in FIGS. 1 and 4 are illustrated as comprising steps 32–4a through 32–4i of progressively increasing density. All of the step wedges are of neutral density; that is, they do not alter the color temperature of the radiation transmitted therethrough but merely attenuate it.

The step wedges are used to form records on the film regarding the intensity of reflected radiation and the intensity of incident radiation in each spectral band and precisely located with respect to the coordinate systems of the photographs with which they are respectively associated. For example, the y-axis through principal points 42 and 46 and the x-axes through principal points 44 and 48 intersect at points 60 and 62, and the y-axis through principal points 44 and 48 and the x-axes through principal points 42 and 46 intersect at points 64 and 66. Also, the step wedges 32–1, 34–1, 36–1 and 38–1 are precisely positioned with respect to the axis intersection points 64, 60, 66 and 62. The same is true for step wedges 32–2, 34–2, 36–2 and 38–2; for step wedges 32–4, 34–4, 36–4 and 38–4.

Figure 2:
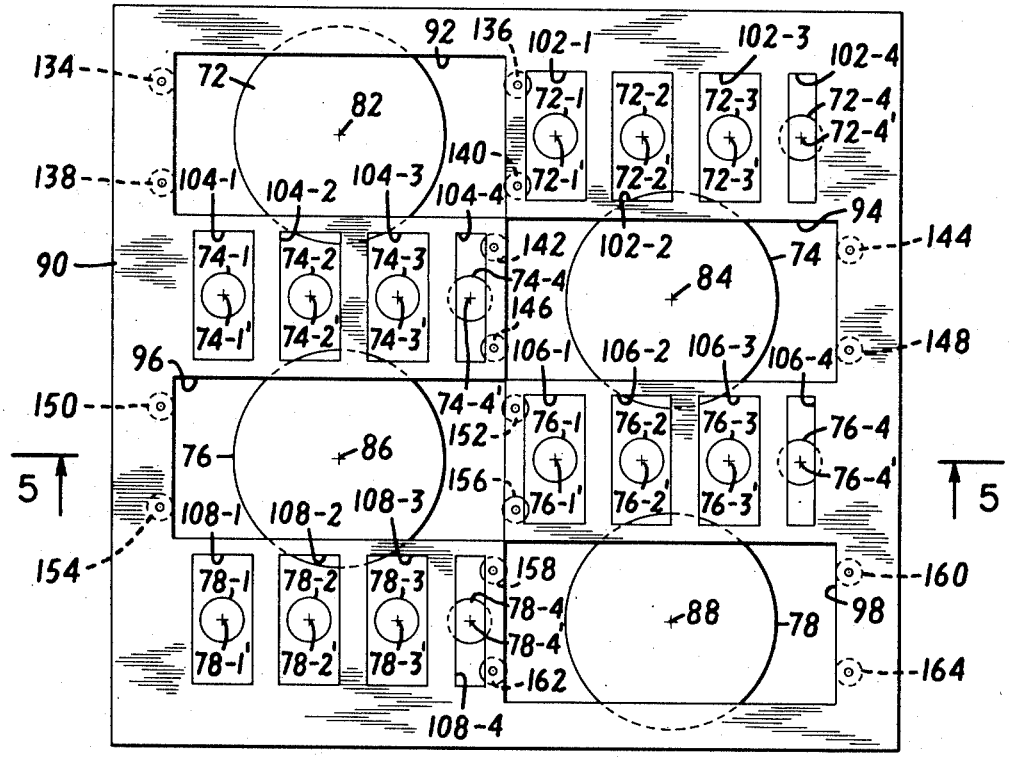
FIG. 2 is a schematic plan view of a multispectral camera in accordance with the invention through the aperture plate, the film and focal-plane shutter being removed.

FIG. 2 is a view through the aperture plate with the film and focal-plane shutter removed. This is one of several embodiments; there are many variations in the method of step wedge and fiducial projection, representative ones of which are described below. Camera lenses 72, 74, 76 and 78 are mounted with their optical axes respectively intersecting the plane of the figure at points 82, 84, 86 and 88. Projection lenses for the step wedges 32–1 through 38–4 are provided and are identified respectively as 72–1, 72–2, 72–3, 72–4; 74–1, 74–2, 74–3, 74–4; 76–1, 76–2, 76–3, 76–4; and 78–1, 78–2, 78–3 and 78–4. The optical axes of the projection lenses for the step wedges respectively intersect the plane of the figure at points 72–1', 72–2', 72–3', 72–4'; 74–1', 74–2', 74–3', 74–4'; 76–1', 76–2', 76–3', 76–4'; and 78–1' 78–2', 78–3' and 78–4'.

The aperture plate 90 is formed with apertures 92, 94, 96 and 98 for the lenses 82, 84, 86 and 88, respectively. The aperture plate 90 is also formed with apertures 102–1, 102–2, 102–3, 102–4; 104–1, 104–2, 104–3, 104–4; 106–1, 106–2, 106–3, 106–4; and 108–1, 108–2, 108–3 and 108–4 for the lenses 72–1 through 78–4, respectively.

Figure 3:
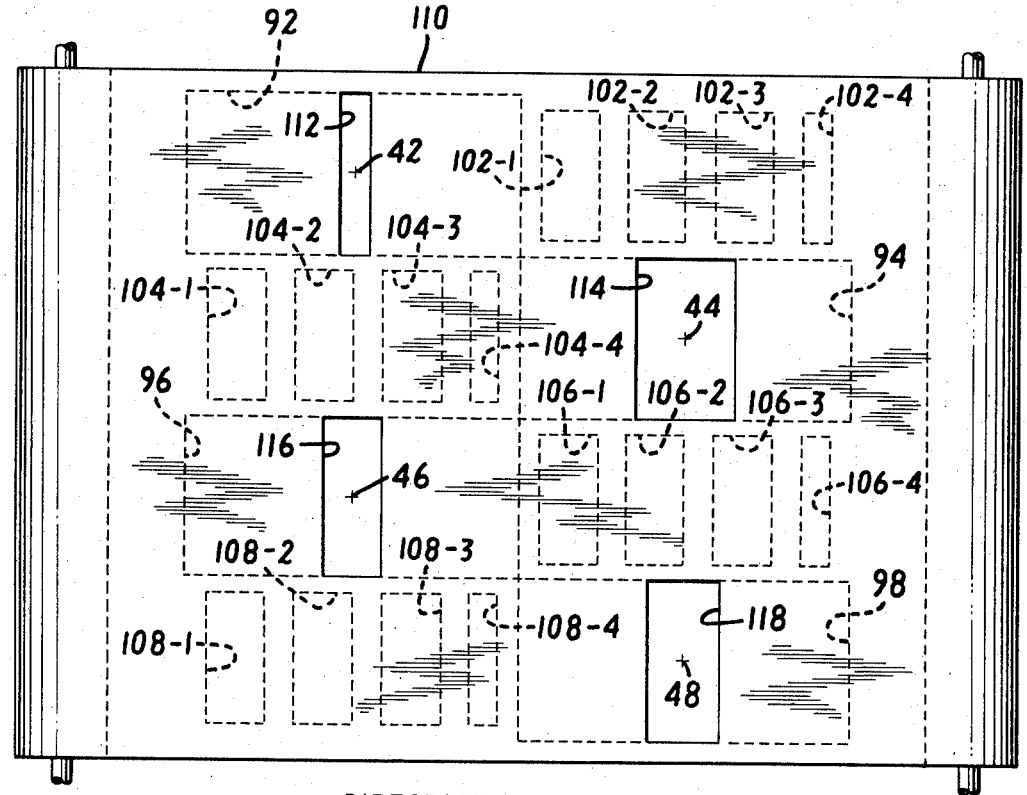
FIG. 3 is a schematic plan view of a focal-plane curtain shutter in accordance with the invention, the outline of apertures in the aperture plate being shown in dotted outline.

FIG. 3 shows a curtain-type focal-plane shutter 110 with the aperture plate 90 removed but with the outlines of the apertures 92 through 98 and 102–1 through 108–4 indicated in broken outline. The shutter 110 is so constructed that slits 112, 114, 116 and 118 simultaneously traverse the principal points 42, 44, 46 and 48, respectively. The slits can be adjusted in width to compensate for filter factors in a conventional manner. The step wedges 32–1 through 38–4 are imaged on the film 30 in the same fashion as are the four photographs 32 through 38 except that, since the shutter moves left to right as indicated by the arrow, the wedges 32–1 through 32–4 associated with the photograph 32 and the wedges 36–1 through 36–4 associated with the photograph 36 are imaged slightly after the photographs, whereas the wedges 34–1 through 34–4 associated with the photograph 34 and the wedges 38–1 through 38–4 associated with the photograph 38 are imaged slightly prior to the photographs. In normal practice, however, the time delay is less than one second, which is the normal maximum transit time of the slits across the format.

FIG. 4 shows the step wedges, exemplified by wedges 32–1a, through 21–1r and by wedges 32–4a through 32–4i as they are projected onto the film. The density of the wedges can be graded in discrete steps, as shown, or continuously. Two discrete types are shown. The one shown on the left is an 18-step grey wedge, while a sensitometric wedge of nine steps is shown to the right. The radiation forming these wedges is of substantially constant amplitude over the range .36 to .9 micron, in order to avoid the introduction of unwanted spectral effects of impinging radiation in the film image. The wedges are of sufficient density range that a linear relationship of film image density results for the entire exposure range of the system projecting the wedges onto the film.

Figure 5:
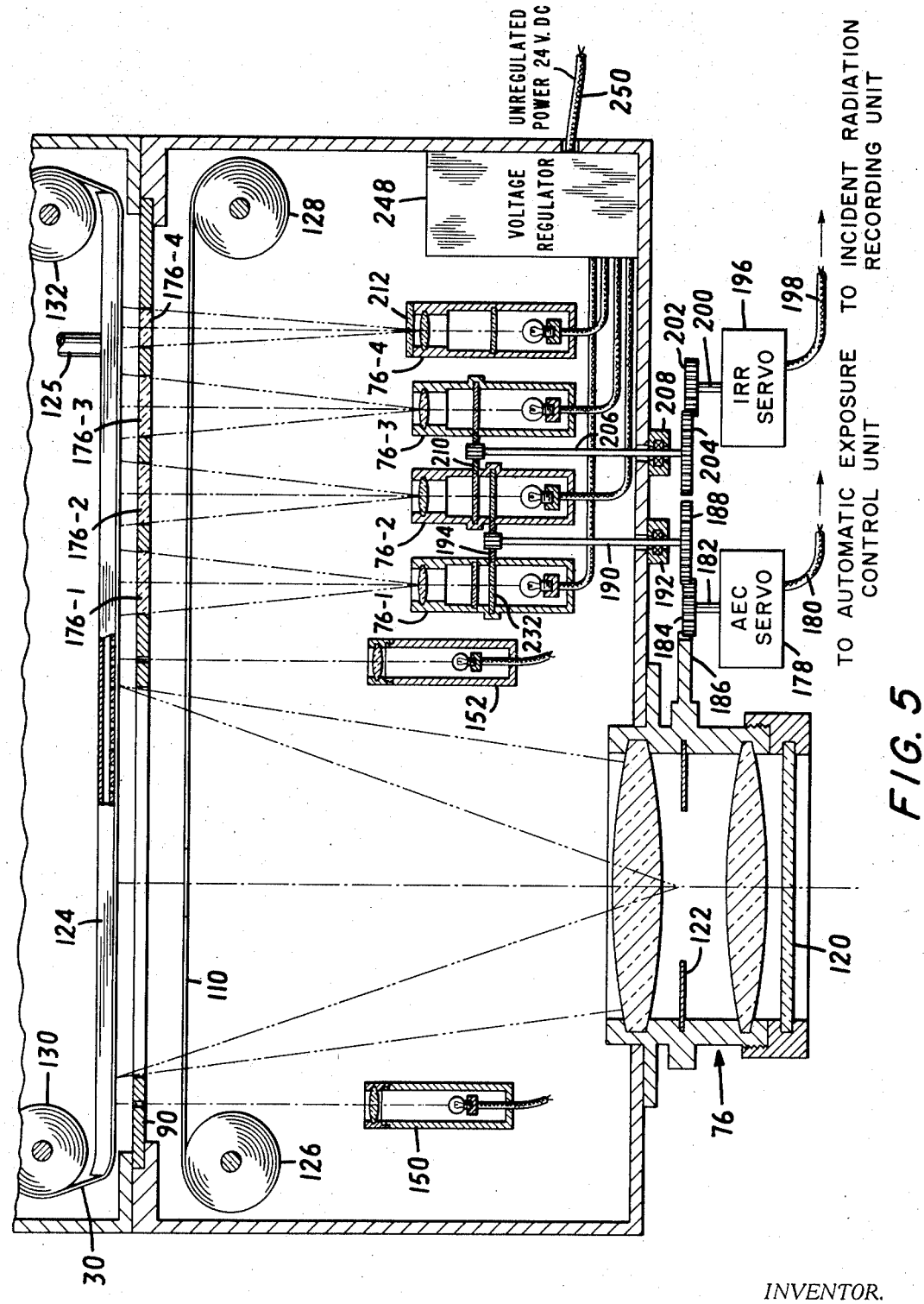
FIG. 5 is a schematic view in sectional elevation, taken along the line 5—5 of FIG. 2, looking in the direction of the arrows and showing a multispectral camera constructed in accordance with the invention.

FIG. 5, which is a section through the line 5—5 of FIG. 2, shows the lense 76 and its associated filter 120 and iris diaphragm 122. The curtain shutter 110, aperture plate 90, film 30 and vacuum platen 124 with its suction line 125 are also shown. The curtain shutter 110 is transported between spools 126 and 128, and the film 30 is transported between spools 130 and 132.

Fiducial optical projection devices are arranged as shown in FIG. 2. Projectors 134, 136, 138 and 140 are associated with the lens 32; projectors 142, 144, 146 and 148 are associated with the lens 74; projectors 150, 152, 154 and 156 are associated with the lens 76; and projectors 158, 160, 162 and 164 are associated with the lens 78. FIG. 5 shows two of the fiducial optical projection devices 150 and 152, described in greater detail below. FIG. 5 also shows the four optical projection devices 76–1, 76–2, 76–3 and 76–4 for the step wedges 36–1, 36–2, 36–3 and 3–4, respectively. The optical projection devices 76–1 through 76–4 illuminate grey scale wedges 176–1, 176–2, 176–3 and 176–4, respectively. The grey scale wedges 176–1 through 176–4 comprises discrete neutral-density filters that filter radiation from the projectors 76–1 through 76–4, respectively, to produce the step wedges 36–1 through 36–4, respectively. The optical projection devices produce the step wedges by illuminating the grey scale wedges as the curtain shutter 110 passes across the film 30. Various other ways of imaging the step wedges are disclosed in connection with subsequent figures.

An automatic exposure control (AEC) servo 178 controls the lens diaphragm 122 in a conventional manner. In accordance with the invention, however, it is also connected to the step wedge projectors 76–1 and 76–2. The AEC servo 178 receives an input from an automatic exposure control unit over a lead 180 and supplies an output by a shaft 182 that turns a pinion gear 184. The pinion gear 184 is connected to a sector gear 186 by means of which the diaphragm 122 is conventionally controlled and to a pinion gear 188 that turns a shaft 190 mounted in bearings 192. The shaft 190 carries at its end opposite the pinion gear 188 a circular, variable-density filter 194 that rotates with the shaft 190 about the shaft axis.

An incident radiation recording (IRR) servo 196 receives an input from an incident radiation recording unit over a line 198 and turns an output shaft 200 to which is connected a pinion gear 202.

The pinion gear 202 drives a pinion gear 204 that turns a shaft 206 journaled in bearings 208. The end of the shaft 206 opposite the pinion gear 204 carries a circular, variable-density filter 210.

The filters 194 and 210 are described in greater detail below in connection with FIGS. 6 and 9. The filter 194 controls the luminous output of the step wedge projector 76–1, and the filter 210 controls the luminous output of the step wedge projector 76–3. The filters 194 and 210 together control the luminous output of the step wedge projector 76–2.

The step wedge projector 76–4 is unmodulated and serves as a sensitometric processing control. The step wedge projector 76–4 has a filter 212 the same as the camera lens filter 120 so that the radiation projected on the film 30 by the projector 76–4 has the same characteristics as the spectral record with which it is associated. It is the only step wedge projection system of the four shown in FIG. 5 with such a filter.

Figure 6:
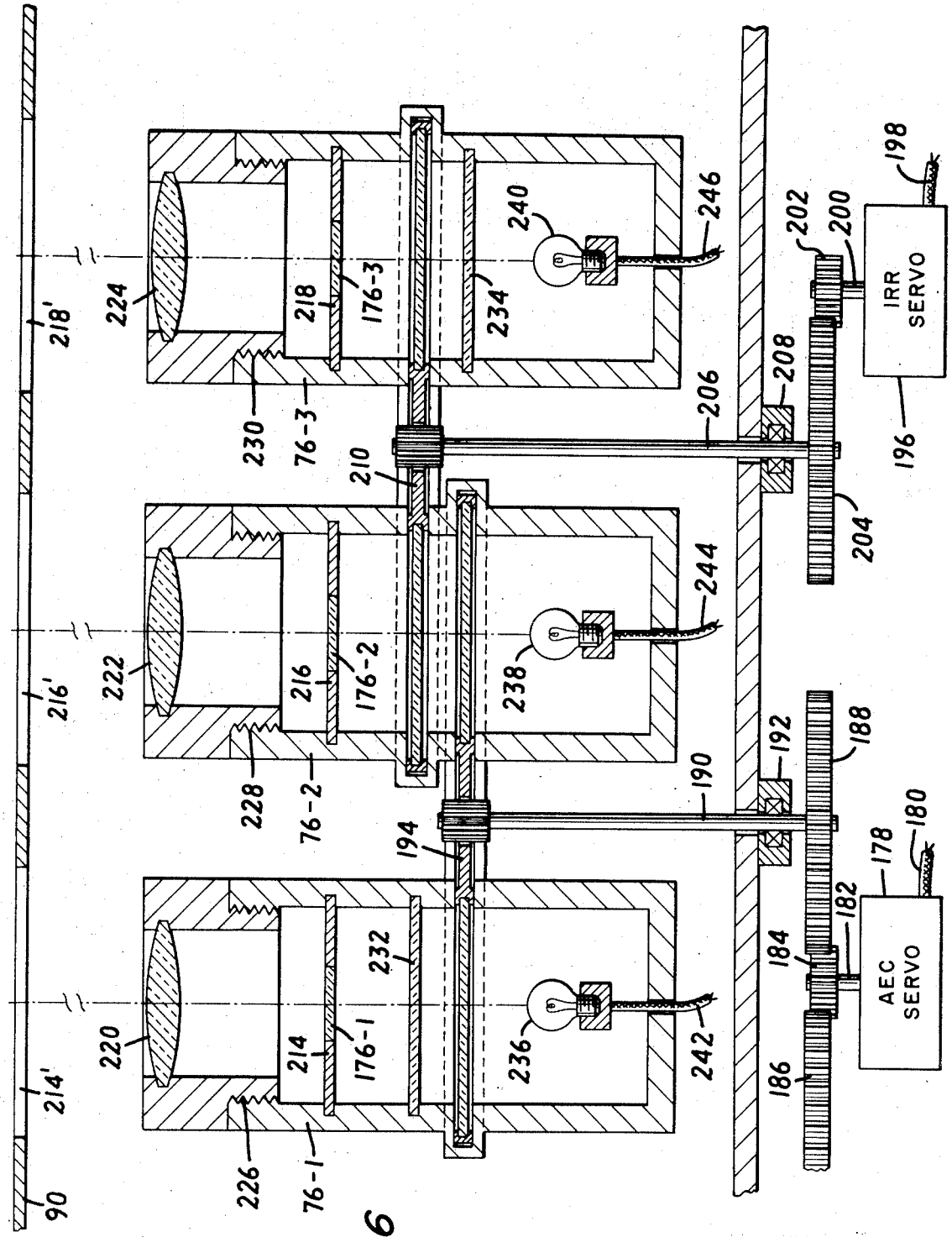
FIG. 6 is a schematic view in sectional elevation, on an enlarged scale, of a portion of the apparatus shown in FIG. 5 for producing step wedges as shown in FIGS. 1 and 4.

FIG. 6 shows in greater detail the structure of the step wedge optical projection devices 76–1 through 76–3 and the means for their control. The embodiment of FIG. 6 differs from the embodiment of FIG. 5 in which the devices illuminate grey scale wedges in the aperture plate 90. In the embodiment of FIG. 6, the grey scale wedges 176–1, 176–2, 176–3 are mounted in the planes 214, 216 and 218 for projection by lenses 220, 222 and 224, respectively. They are projected onto the film 30 through opening 214', 216' and 218' in the aperture plate 90. Provision for focusing and thus adjusting the scale of the image is made by screw threads 226, 228 and 230, respectively.

The lens aperture projector (LAP) 76–1 shown in FIG. 6 contains a stationary neutral-density filter 232 in addition to the movable neutral-density filter 194. The density gradations of the two filters 194 and 232 where they overlap in the projector 76–1 are continuous and are of opposite polarities; i.e., one becomes progressively less dense in the same direction in which the other becomes progressively more dense. The filter 194 also extends into the projector 76–2, where it cooperates with the movable neutral-density filter 210. The density gradations of the two filters 194 and 210 where they overlap in the projector 76–2 are continuous and of opposite polarities. The filter 210 extends into the projector 76–3, where it cooperates with a stationary neutral-density filter 234. The density gradations of the two filters 210 and 234 where they overlap in the projector 76–3 are continuous and of opposite polarities.

The filter 194 is rotated by the AEC servo 178 in proportion to the opening of the lens 76. The sum of the densities of filters 194 and 232 becomes darker as the aperture of the lens 76 becomes smaller and conversely becomes lighter as the AEC servo 178 opens up the lens 76. An understanding of the functioning of the filters may be gained from FIG. 9, discussed below, and from my copending U.S. patent application Ser. No. 607,539, particularly FIG. 3 and the associated description in the specification.

The incident solar radiation projector (SRP) 76–3 shown in FIG. 6 operates on the same principle as the LAP projector 76–1, except that the angle of rotation of the movable filter 210 is controlled by the IRR servo 196. The density of the step wedges imaged on the film 30 is proportional to the angular position of the neutral-density filter 210. The sum of the densities of the filter 210 and the filter 234 becomes greater as the intensity of the radiation incident on the solar radiation recording sensor increases.

The lens aperture and incident solar radiation projector 76–2 (the LASRP projector) shown in FIG. 6 contains both of the movable filters 194 and 210, which are respectively operated by the AEC servo 178 and the IRR servo 196. The rotation of these filters effects by virtue of their design the algebraic summation of the densities associated with the LAP and SRP.

The projectors 76–1, 76–2 and 76–3 are provided with standard lamps 236, 238 and 240 connected by leads 242, 244 and 246, respectively, to a voltage regulator 248 (FIG. 5) and through it to an unregulated power supply at 24 volts DC over a line 250. The filters of the three projectors attenuate the image-forming radiation from the lamps 236–240 in accordance with the angular positions of the variable filters 194 and 210. The densities of the step wedge images formed on the film 30 are adjusted accordingly.

The correct compensation for various scene brightnesses will be made using one of the many possible embodiments of step wedge modulation. FIG. 6, which shows how the step wedge optical projection device is associated with the lens aperture, incident solar radiation, and the combination of lens aperture and solar radiation, will be used.

As described previously, the automatic exposure control servo 178 operates a continuous, variable, neutral-density circular filter 194 which, when combined with the optical projection devices shown in FIG. 6, modulates the densities of the step wedge images by the operation of the servo 178. That is, the lens aperture filter has the effect of getting darker as the camera lens aperture closes down, and the filter gets lighter as the lens aperture opens up.

The incident solar radiation servo 196 controls a similar filter 210 which has the effect of getting lighter as the incident solar radiation increases. The center step wedge optical projection device 76–2, which combines the lens aperture and incident radiation, has a luminous output that is a function of the algebraic sum of the densities of the two filters where they overlap in the projector 76–2.

Figure 7:
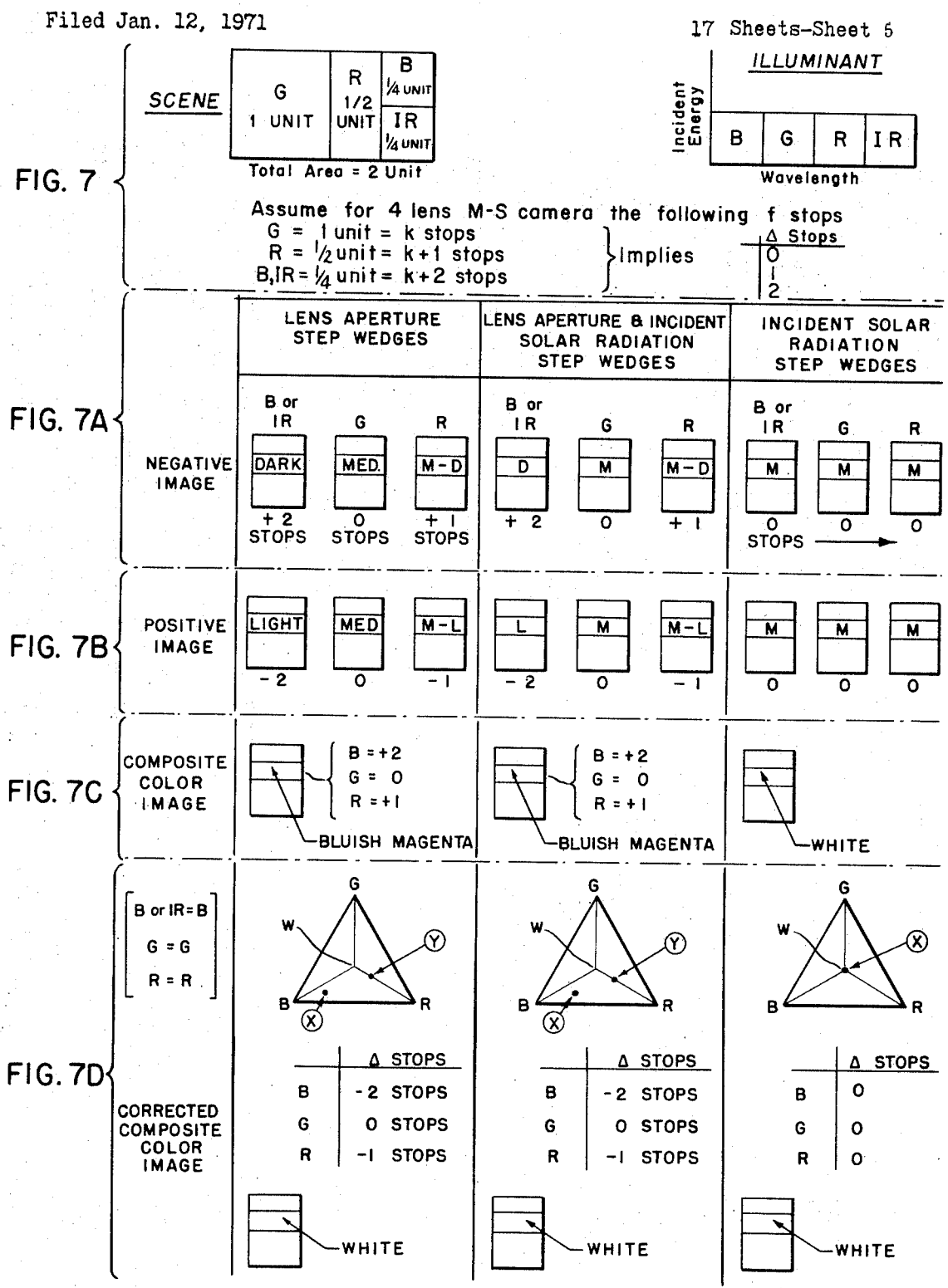
FIG. 7 is a schematic illustration of the color characteristics of a hypothetical scene and illuminant.

The operation of the apparatus is shown in detail in FIGS. 7 and 7A througfh 7D for an arbitrary scene photographed under a first assumed illuminant and in FIGS. 8 and 8A through 8D for the same scene photographed under a second assumed illuminant.

Let us consider a scene that reflects solar radiation in four bands in the average amounts shown in FIG. 7. This average is arbitrarily assumed for purposes of exposition to be composed of one unit of green, one-half unit of red, one-quarter unit of blue, and one-quarter unit of infrared. Although there may be few if any specific objects in the scene with this average composition, we have for descriptive purposes segregated all of the color units of the scene into categories, and then examined the transformation of this ground object of average composition. The purpose in doing this is solely to explain the operation of the apparatus; the invention is in no way dependent on this characteristic of the scene.

As FIG. 7 shows, the illuminant is assumed to have a uniform spectral distribution at an arbitrary value. That is, the blue, the green, the red and the infrared all have the same energy. We assume that a four-lens multispectral camera is employed in which the automatic exposure control adjusts the lens stops. The radiation from the scene is assumed to be one unit in the green portion of the spectrum, and the proper stop for the lens responsive to the green is automatically set. This will be called $k$ stops. Since radiation in the red band equals one-half unit, the lens responsive to red is set at $k+1$ stops. Radiation in the blue band equals one-quarter unit, so the lens responsive to blue is set at $k+2$ stops. Similarly, since the infrared radiation equals one-quarter unit, the lens responsive thereto is set at $k+2$ stops. This implies that the differences between stops, as referred to the lens for the green band (i.e., the numbers of delta stops), are zero, plus one, plus two, and plus two for the green, red, blue and infrared bands, respectively.

The effect that the optical projection devices 76–1, 76–2 and 76–3 shown in FIG. 6 would have on the negative images, the reproduced positives and the composite color renditions of the recombined color images can be traced with the aid of FIGS. 7 and 7A through 7D. The description to follow will also show the apparent colors of the composite images and the corrections necessary to be made on the controls of the additive color viewer in order to produce an achromatic (white) image of the colored step wedges.

Let us look first at the lens-aperture step wedges. The operation of the AEC servos such as the servo 178 of FIG. 6 in each of the spectral bands adjusts the densities of the negative images of the lens-aperture step wedges (FIG. 7A). An arbitrary step in the wedge on the straight-line part of the characteristic curve is indicated in the left box of the figure. Thus, in the step wedge for the blue or infrared, a particular step will be "dark;" in the step wedge for the green, the same step will be "medium," and in the step wedge for the red, the same step will be "medium-dark." It is understood that these designations are relative and are applied merely to facilitate discussion of the differences among them. The measurable delta stops are plus two, zero, and plus one, respectively, as shown in FIG. 7A.

The positive photograph (FIG. 7B) in the linear transformation at unity gamma to a positive image produces a step wedge with the inverse effect, having in the blue or infrared band minus two delta stops, in the green zero delta stops, and in the red minus one delta stops. The same steps may be characterized as "light," "medium," and "medium-light," respectively.

The composite color image of the wedges possesses (in that particular step) plus two delta stops of blue, zero delta stops of green, and plus one delta stop of red, as shown in FIG. 7C. The image thus has a bluish-magenta cast.

Upon projection to form a composite image, true or false color may be employed, as is well known in the art. For present purposes, it is assumed that true color is employed: that is, blue or infrared is projected as blue, green is projected as green, and red is projected as red. The bluish-magenta color is on the straight-line part of the step wedge, and its position in the chromaticity diagram is shown in FIG. 7D by a circled $x$. To place the image in the center of the chromaticity diagram and make it white, it is necessary to make the following correction: minus two stops blue, zero stops green, and minus one stop red. The minus two stops blue places the image at the point designated by a circled $y$, and the minus one stop red places it at the white point $w$. It is of course not necessary that the corrections be made in any particular order. The necessary corrections can be effected in the viewer by adjusting all three brightness controls in some relative fashion, but the relative corrections must be the ones indicated. Variations in gamma that exist due to different slopes of the characteristic curve for each spectral record can be corrected to match the curve of least slope by desaturation of the higher gamma spectral records. This is accomplished by adding white to the images of the sensitometric control wedges after the corrections described herein have been performed.

We will next consider FIGS. 7A through 7D in connection with the incident solar radiation step wedges. The incident solar radiation step wedges, controlled by incident solar radiation servos such as the servo 196 (FIG. 6), show no differential stops between the bands. This is because we have assumed a uniform distribution of incident illuminant. This results in a no-differential color in an arbitrary step in the wedges associated with each band, and the image is white when superimposed in the additive color viewer. Thus, a particular step in the step wedge is medium in the negative for the records relating to blue or infrared, and the same is true of the records relating to green and red (FIG. 7A). The positives for the blue or infrared, for the green, and for the red are also medium, as shown in FIG. 7B. The composite color image is white, as shown in FIG. 7D, and no adjustment is necessary in order to render it white, as FIG. 7D clearly shows.

We will next consider FIGS. 7A through 7D in connection with the lens aperture and incident solar radiation step wedges. These are under the control of both the AEC servo 178 and the IRR servo 196. Exactly the same images are produced as those discussed previously in connection with the lens aperture step wedges (left portions of FIGS. 7A through 7D). The delta stop values of these step wedges are identical. Thus, in FIG. 7A, showing the negative images, the step wedge record relating to blue or infrared is dark in a particular step; relating to green is medium in the same step, and relating to red is medium-dark in the same step. The delta stops for the blue or infrared, for the green, and for the red, are, respectively, plus two, zero and plus one. In the case of the positive images, shown in FIG. 7B, the same step in the wedge is light in the blue or infrared, medium in the green, and medium-light in the red, and the delta stops for the blue and infrared, for the green, and for the red, are, respectively, minus two, zero and minus one.

In the case of the composite color image (FIG. 7C), the results are again the same as those for the lens-aperture step wedges. That is, the same step in the wedge contains plus two delta stops worth of blue, zero delta stops worth of green, and and plus one delta stop worth of red and is bluish-magenta.

As shown in FIG. 7D, the correction necessary to move from $x$ to $w$, whether or not through point $y$, is minus two delta stops of blue, zero delta stops of green, and minus one delta stop of red. Naturally, the absolute brightness values of the images of the wedges formed on the viewer screen depend on the brightness of the viewer projection lamps.

In FIG. 7 and FIGS. 7A through 7D, we have assumed particular scene and a particular illuminant. The resulting composite image is grey prior to making the correction shown by FIG. 7D, because each of the lens apertures has been adjusted exactly the right amount to compensate for the differences in radiation reflected by the particular color in the scene to which it is sensitive. Each image is thus at the same point on the photographic characteristics curve. Color is introduced in the viewer screen because an adjustment is made (FIG. 7D) to the projection intensities to make the step wedges white. This results in adding colors to the composite rendition of all spectral photographs, thus compensating for the different apertures of the several lenses.

Figure 8:
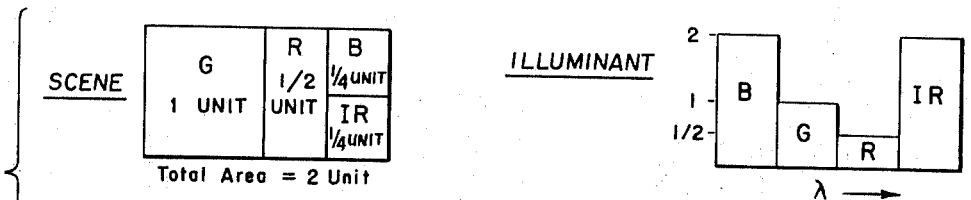

FIGS. 8 and 8A through 8D are like FIGS. 7 and 7A through 7D in that the same color distribution in the scene is assumed; however, the illuminant is assumed in FIG. 8 to vary with wavelength as shown. The green band, which has unit area under unit illumination, has zero delta aperture stops; the red band, which has one-half unit area under one-half unit illumination, has two delta aperture stops; the blue band, which has one-quarter unit area under two units of illumination, has plus one delta aperture stops; and the infrared band, which has one-quarter unit area under two units of illumination, has plus one delta aperture stop.

The automatic exposure control servo 178 in FIG. 6 rotates the circular continuously variable neutral density filter 194 for the lens aperture projection system 76–1 so that the negative images of the step wedges are as shown in FIG. 8A. The stops associated with an arbitrary step in the step wedges are plus one for the blue and infrared, zero for the green, and plus two for the red. The steps are medium-dark in the blue or infrared, medium in the green, and dark in the red. The transformation in printing the positive images makes the reverse of the step wedges, giving densities corresponding to minus one, zero, and minus two, respectively (FIG. 8B). The steps are medium-light, medium, and light, respectively.

When these images are superimposed in the additive color viewer to form a composite color image (FIG. 8C), a reddish-magenta image is produced which contains plus one dealt units blue, zero delta units green, and plus two delta units red.

The position of the color solid is as shown in FIG. 8D. The correction to make the image white is to remove one stop worth of blue projection light, to make no change in the green, and to remove two stops worth of red. The corrections can be made in any sequence, but, if the correction to red is first performed and then the correction to blue is performed, this moves the image from point $x$ to point $y$ to the white point $w$.

Considering FIGS. 8A through 8D again in connection with the incident solar radiation step wedges, the incident radiation servo 196 controls the position of the circular neutral density filter 210 associated with the incident solar radiation projection system 76–3 in such a manner that step wedges of the relative densities shown in FIG. 8A are produced on the film 30. Since the illumination in the blue spectral band has doubled in FIG. 8A as compared to FIG. 7A, it is plus one delta stop in FIG. 8A. The green spectral band remains at zero delta stops and the red spectral band is minus one delta stop since the red radiation is reduced one-half. The arbitrary steps of the step wedges are dark, medium and light for the blue or infrared, the green, and the red, respectively.

FIG. 8B shows the positive images. The same steps are relatively light, medium and dark for the blue or infrared, the green, and the red, respectively, and are respectively characterized by minus one delta stops, zero delta stops and plus one delta stops.

When the positives are projected in a superimposed relation in the additive color viewer the three arbitrary steps project a single image with plus one delta stop of blue, zero delta stops of green, and minus one delta stop of red.

FIG. 8D shows the correction necessary to produce white. It is necessary to remove one delta stop of blue, to make no change in the green, and to add one delta stop of red. If the correction to blue is made first and then the correction to red, this moves the image from point $x$ to point $y$ to the white point $w$.

The projection system 76–2 shown in FIG. 6 is associated with both lens aperture adjustment and incident solar radiation adjustment. Step wedges are produced in each band different from those produced by the lens aperture projector 76–1 alone or the incident solar radiation projector 76–3 alone. The algebraic sum of the stops associated with the lens aperture and incident solar radiation step wedges is shown in FIG. 9. FIG. 9 shows counter-rotation of the two circular filters 194 and 210. The projectors 76–1, 76–2 and 76–3 are indicated in dotted outline.

Figure 9:
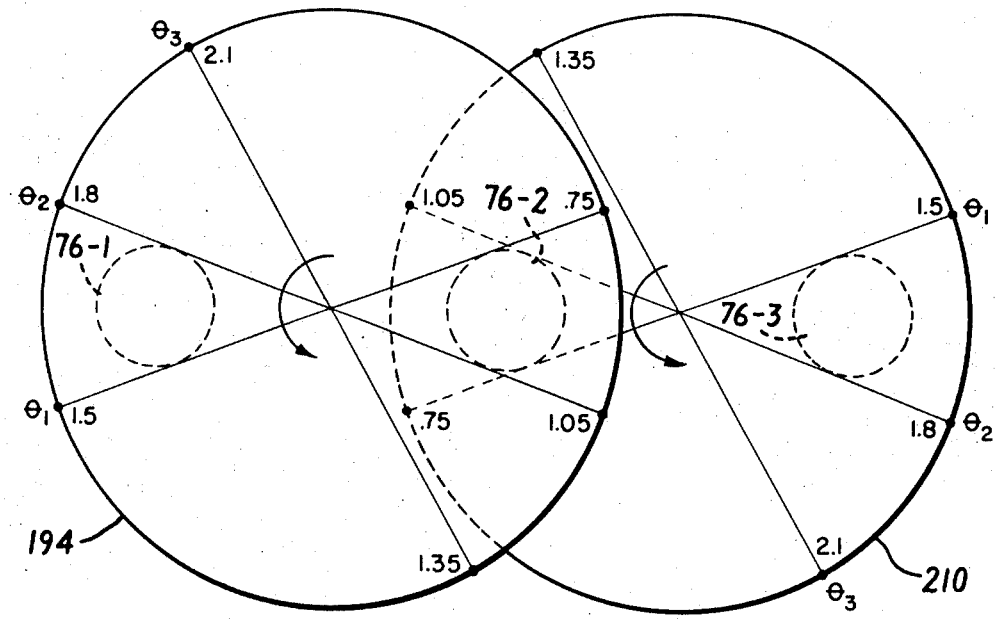
FIG. 9 is a schematic plan view of a neutral-density filter the density of which is constant over a given solid angle but that is continuously variable for attenuating radiation in the manner required by the invention.

The relationships shown in FIG. 9 show how the variable neutral density coatings can be deposited on circular filters to achieve the desired attenuation of the LAP, SRP, and LASRP projectors 76–1, 76–3, and 76–2, respectively. To achieve the desired effect, the density of the filter 194 increases continuously in a clockwise direction. Values of the density at various angular positions are indicated as .75, 1.05, 1.35, 1.5, 1.8 and 2.1. The absolute values are different on the halves associated with projection systems 76–1 and 76–2, respectively. The density gradient in the case of the right half of the SRP filter 210 is the same as that on the left half of the LAP filter 194. However, the density gradient on the left half of the SARP filter 210 is opposed to that of the right half of the LAP 194 filter and is of decreased amplitude as compared to the right side of the SRP filter.

The middle portions of FIGS. 8A through 8D show the results of projection through the projector 76–2 including the filters 194 and 210 in series as shown in FIG. 9.

As FIG. 8A shows, the negative image has plus two delta stops in the blue or infrared, zero delta stops in the green, and plus one delta stop in the red. The arbitrary steps of the step wedges are, respectively, dark, medium and medium-dark.

As FIG. 8B shows, in the positive images, the steps of the step wedges are respectively light, medium and medium-light, and there are minus two delta stops in the blue or infrared, zero delta stops in the green, and minus one delta stop in the red.

As FIG. 8C shows, the composite color image is bluish-magenta, having in the arbitrary step of the step wedge plus two delta stops of blue, zero delta stops of green and plus one delta stop of red.

FIG. 8D shows the correction in projection to produce white: minus two delta stops of blue, zero delta stops of green, and minus one delta stop of red. If the correction to blue is first made and then the correction to red, the projection point moves from point $x$ to point $y$ to the white point $w$. This correction is the same one used in the case of the scene under a uniform illuminant (FIG. 7D). Color has been introduced into the hypothetical grey scene by manipulating projector colors exactly in the same amount both in the case of the uniform illuminant and in the case of the illuminant of arbitrary distribution (where the scene has the same relative composition of colors). The investigator is thus able to determine that the observed change in the scene was only apparent and not real; that is, that the scene itself remained constant but the illuminant changed.

In this fashion it is possible to achieve accurate color reproduction of multispectral photography over the entire latitude introduced by modulation of lens aperture when automatic lens control is employed.

FIG. 10 shows an alternate embodiment of the three projection systems 76–1, 76–2 and 76–3. In this embodiment, the grey-scale wedges 176–1, 176–2 and 176–3 are located in the aperture plate 90. Modulation of the light projected onto the grey-scale wedges and thus imaging the wedges on the film is controlled by variable, neutral-density film strips. The effect is identical to that achieved by the structure of FIG. 6. In the structure of FIG. 10, however, the density gradation of the filters is a function of length along the filter strips rather than angular position along circular filters. For example, the fixed filter 232' is graded across the projector 76–1, and the filter 194' is graded in an opposite sense, as disclosed in my copending patent application Ser. No. 607,539. The movable filter 194' is moved between spools 194a and 194b. Likewise, the filter 194" cooperates with the filter 210', the two filters being graded linearly and in opposite directions. The filter 194" moves between spools 194"a and 194"b. The filter 210' moves between spools 210'a and 210'b. Similarly, the filter 234' and the filter 210" cooperates with each other and are graded linearly and in opposite senses. The filter 210" moves between spools 210"a and 210"b.

The movable filters are driven in any suitable way from the shafts 190 and 206. For example, the shaft 190 turns a worm gear 190a that drives a sprocket 190b driving the filter 194' and a sprocket 190c driving the filter 194". Similarly, a worm gear 206a turned by the shaft 206 engages a sprocket 206b driving the filter 210' and a sprocket 206c driving the filter 210".

FIG. 11 shows still another embodiment in which the light used in the projectors 76-2 and 76-3 is provided by a fiber optics bundle 250 having an output proportionate to the incident radiation and forming a Y of which one branch 252 supplies light to the projector 76-2 and the other branch 254 supplies light to the projector 76-3. This has the advantage of reducing the number of lenses required by the projectors. Otherwise the principle of operation is exactly the same. However, the method of detecting the incident radiation is different. This method will be discussed later.

FIG. 12 is still another embodiment of the three projectors in which attenuation of the light illuminating the grey-scale wedges is effected by control of the stops of the projection lenses. Adjustable diaphragms 256, 258 and 260 are provided for this purpose. The diaphragm 258 of the projector 76-2 must enable the projector 76-2 to produce a luminous output that is the algebraic sum of the LAP and SRP. This is shown as being effected by the combination of an iris diaphragm in the projection lens and a movable, continuously variable, neutral-density filter 262 cooperating with a stationary, continuously variable, neutral-density filter 264. This is effected by providing a pinion gear 266 on the shaft 190 that simultaneously adjusts the diaphragms 256 and 258 and a pinion gear 270 on the shaft 206 that adjusts the movable filter 262. Another pinion gear 272 on the shaft 206 adjusts the diaphragm 260.

In another embodiment (not shown) the same effect is produced electronically by summing the signals to the LAP and SRP and using the signal to modulate the stop in the LASRP.

FIG. 13 shows the fiducial illuminating projector 152 and a projector 76-4 for implementing the standard invarient processing step wedge. The projector 76-4 projects an image of the grey scale wedges 211.

FIG. 13A shows an alternate embodiment of the projection system 76-4 in which the grey-scale wedges 211 are mounted in the aperture plate 90.

In the embodiments of FIGS. 13 and 13A, the projector 76-4 is provided with a filter 212 which corresponds to that in front of the associated camera lens. This gives a step wedge for processing control that incorporates the effect of the wavelength of the radiation used in making the associated photograph when the characteristic curve is reconstructed. The step wedge must have sufficient density range to cover only the variations in the shutter speeds to be used. The density range need not be as large as that of the other three step wedges, since they must also account for the total variation in lens aperture or solar radiation that may be encountered as well as the range of shutter speeds.

FIG. 14 shows one embodiment of the automatic exposure control associated with each of the four spectral bands. A detector 274 supplies an amplifier 276 with a signal proportionate to the detected radiation. The amplifier 276 supplies a signal to the associated AEC servo, such as the servo 178, shown for example in FIG. 5. This signal is supplied over the line 180. The field of coverage of the detector lenses, for example the lens 278, should match the field of coverage of the associated camera lens in the multispectral camera. Of course, the focal length of the lens can be adjusted depending on the surface area of the detector 274, which is shown here as a solid-state device such as a silicon photodiode.

Similar detector-amplifier devices 280, 282 and 284 are provided for the other bands of the multispectral camera. Each has a filter, such as the filter 120, corresponding to the filter for the associated camera lens.

Figure 16:
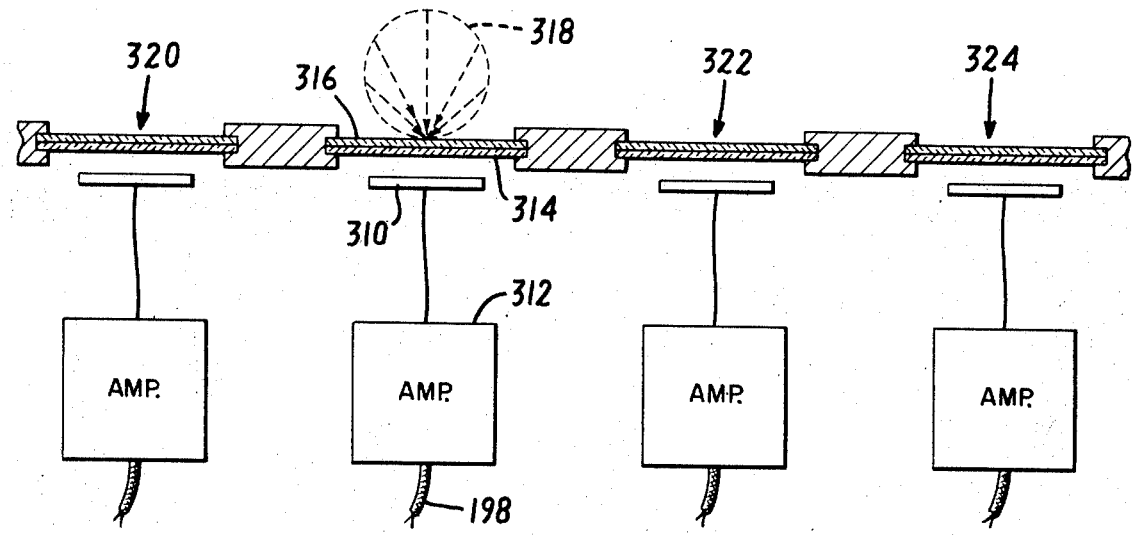
FIG. 16 is a schematic view of an embodiment of an incident radiation detector in accordance with the invention.

FIG. 16 shows an alternate embodiment of the automatic exposure control. Here a single detector and amplifier are used. By means of a filter wheel 286 and a signal generating device 288 that detects the position of the wheel 286 as it rotates rapidly, a detector current output can be made to control the apertures in all four lenses. The amplifiers 276 in this case transmits the signal only when the positioning device 288 shows that a given filter, for example the filter 120 (FIG. 15B) is fully in front of the lens 278. The signal from the detector 288 to the amplifier 276 is supplied over a line 290. The detector device 288 cooperates with a lamp 292 that shines through holes 294, 296, 298 and 300 sequentially to produce a signal on the line 290.

FIG. 15C shows detector current plotted as a function of time to produce gating signals 302, 304, 306 and 308 in sequence.

FIG. 16 shows an embodiment of the incident radiation sensing unit. Four photodiodes such as the photodiode 310 are shown with their amplifier such as the amplifier 321. A diffusing plate 314 and a filter 316 corresponding to the filter for the associated multispectral camera lens, are also shown. The diffuser surface has Lambertian characteristics. Radiation impinging on the detector system, the radiation being indicated schematically at 318, actuates the unit. The other units 320, 322 and 324 are like the one described.

Figure 17:
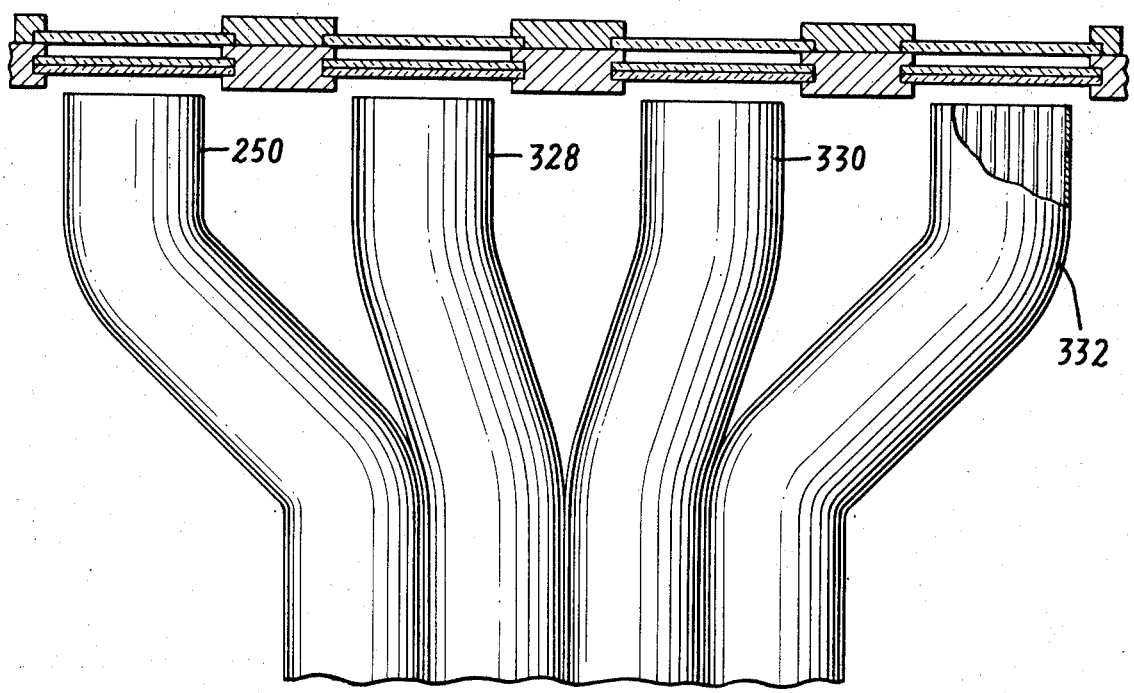
FIG. 17 is an alternate embodiment of the apparatus of FIG. 16.

FIG. 17 shows a fiber optics arrangement wherein the incident radiation is sensed by fiber optics bundles 250 (shown also in FIG. 11) and 328, 330 and 332 and piped directly into the camera rather than going through a servo-controlled amplifier as in the case of FIG. 1.

Figure 18:
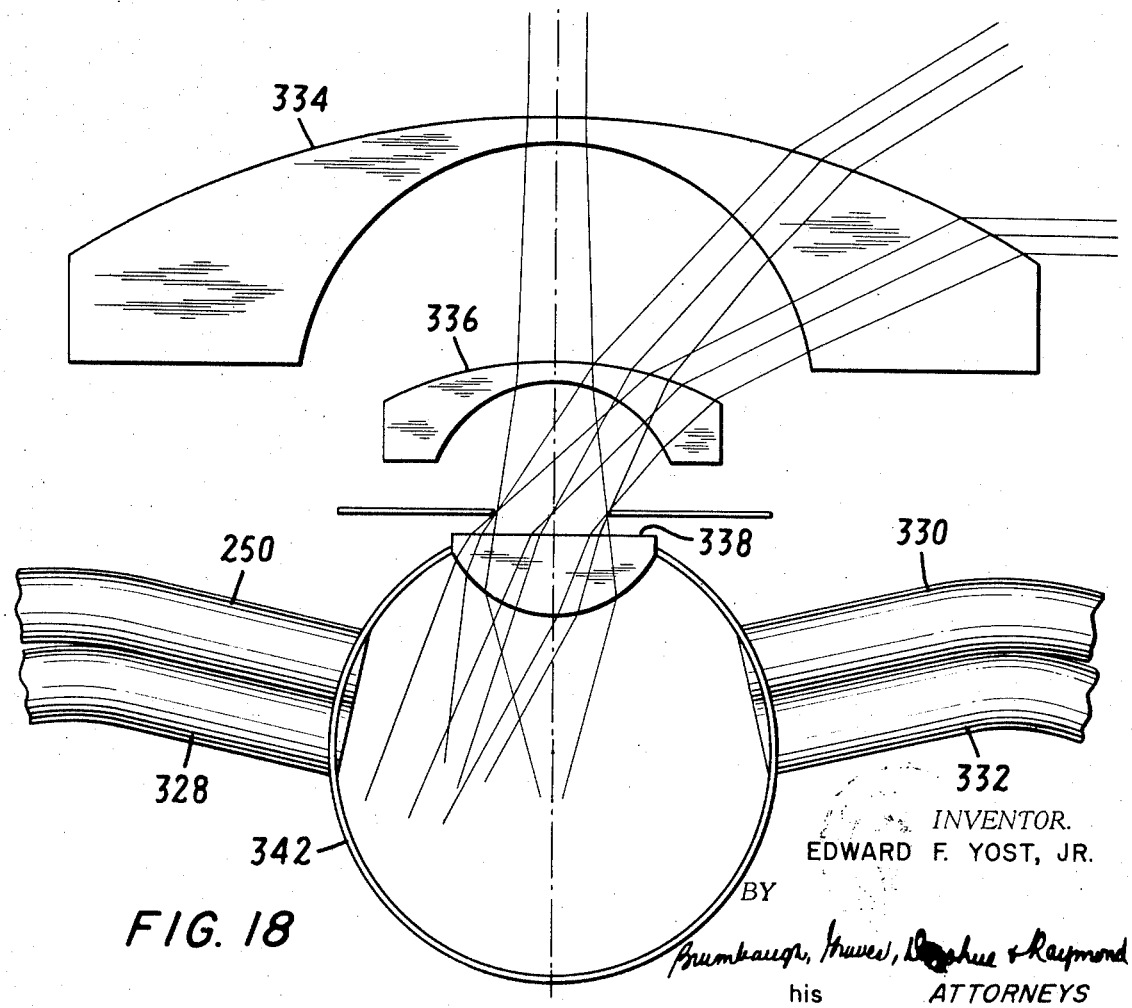
FIG. 18 is a schematic elevational view of a horizon-to-horizon light integrator for collecting incident radiation in accordance with the invention.

FIG. 18 shows a more sophisticated embodiment using a horizon-to-horizon light integrator accomplishing the same effect as that accomplished by the embodiment of FIG. 17 but over a much greater range of sun angles. Lenses 334, 336 and 338 direct light to an integrating sphere 342 to which the fiber optics bundles 250, 328, 330 and 332 are connected.

Figure 19:
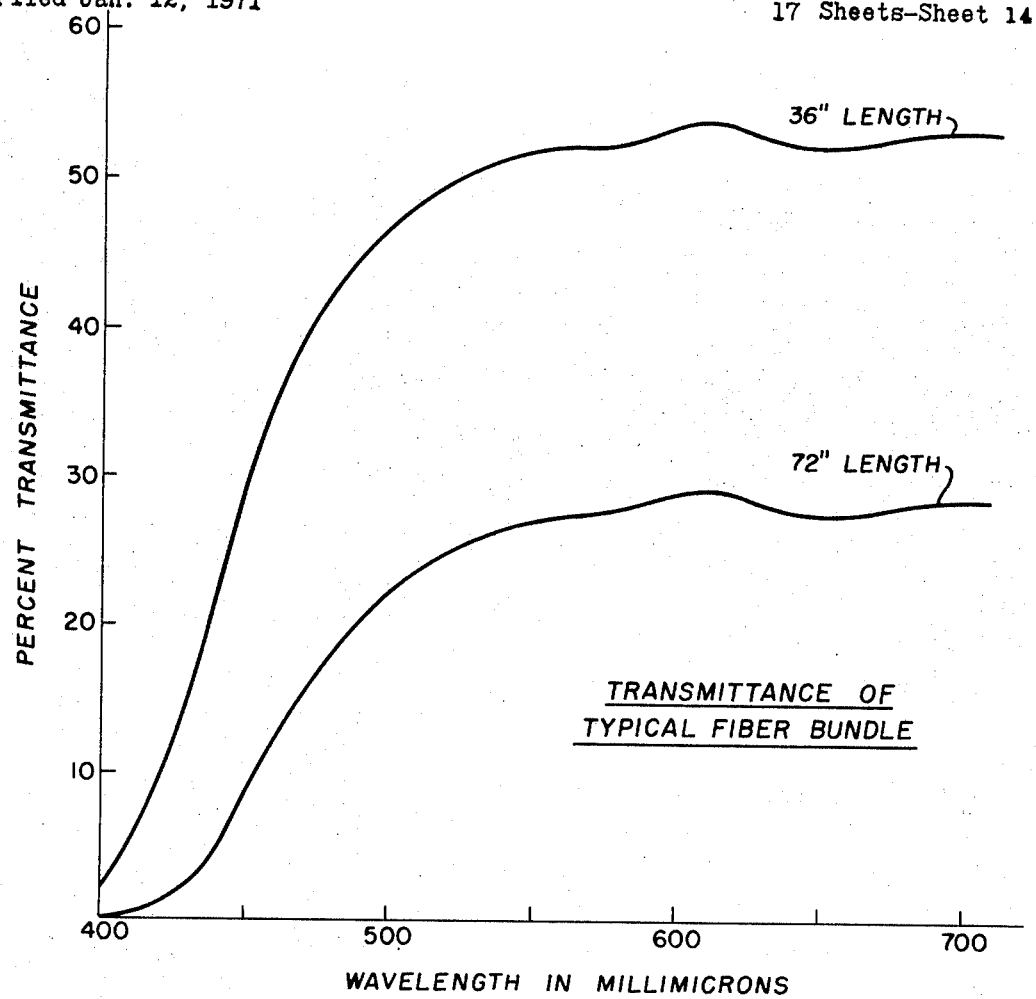
FIG. 19 is a graph of percent transmittance of radiation as a function of wavelength in millimicrons for fiber optics bundles of 36 inches length and 72 inches length, respectively.

FIG. 19 is a graph of percent transmittance as a function of wavelength in millimicrons. It shows the effect on transmission of the radiation down two typical fiber optics bundles as wavelength ranges from 400 to 700 millimicrons. The neutral-density attenuation of the light transmitted by each bundle must be taken into account to even out these selective transmission effects. It is a straightforward matter to compensate for differences in the various spectral bands by adjusting the lengths of the fiber optics bundles.

Figure 20:
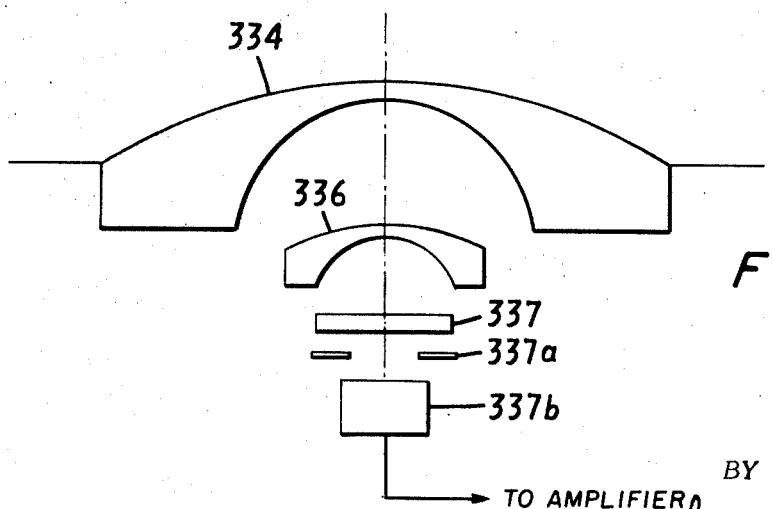
FIG. 20 is a schematic elevational view of another embodiment of horizon-to-horizon detector for collecting incident radiation in accordance with the invention.

FIG. 20 is an embodiment quite similar to the embodiment of FIG. 18 but omitting the integrating sphere 342. It includes lens elements 334 and 336, a filter 337, stop 337a and detector 337b.

Figure 21:
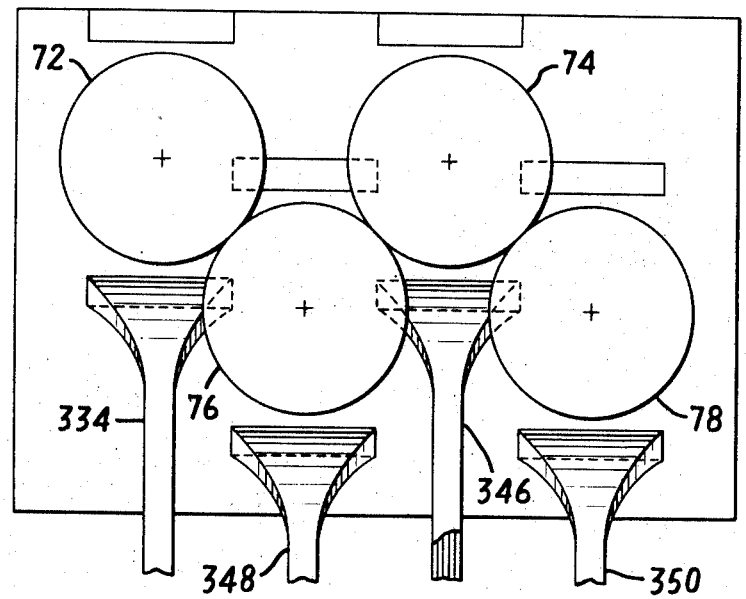
FIG. 21 is a schematic bottom plan view of a simplified embodiment of a multispectral camera in accordance with the invention, wherein only incident radiation is recorded by a fiber optics technique.

FIG. 21 shows in bottom plan a simplified embodiment of the camera wherein only incident radiation is recorded by means including fiber optics. The lenses 72, 74, 76 and 78 are arranged in a format somewhat different from and more compact than that in the embodiment of FIG. 2. Fiber optics bundles 344, 346, 348 and 350 transmit incident radiation in bands the same as those transmitted by the lenses 72 through 78, respectively.

Figure 22:
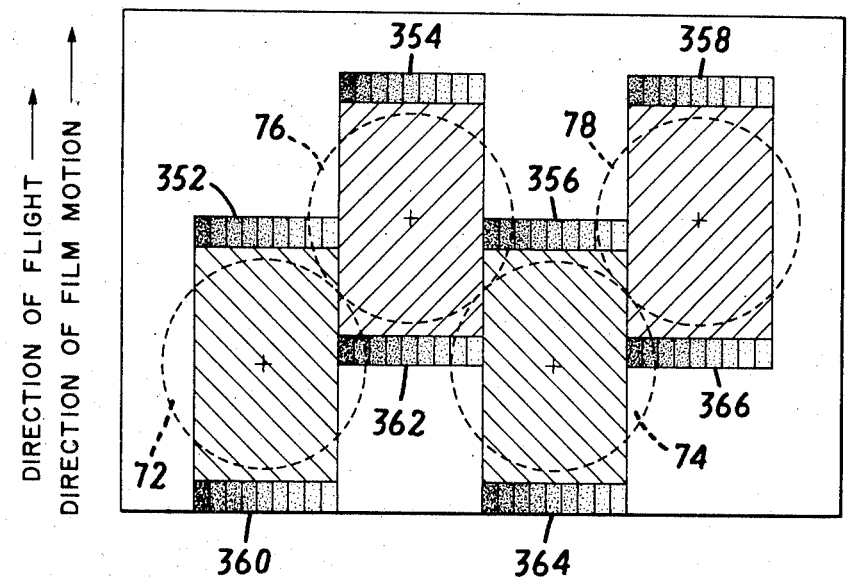
FIG. 22 is a schematic plan view of a film format corresponding to the embodiment of the invention shown in FIG. 21.

FIG. 22 shows the positions of the step wedges 352, 354, 356 and 358 formed by the fiber optics devices 344 through 350, respectively, relative to the film format and the lenses from the top looking down. The remaining step wedges 360, 362, 364 and 366 can be formed by fiber optics devices or in some other way, for example in one of the ways described above. The embodiment of FIGS. 21 and 22 is another demonstration that there are many possible combinations of the systems discussed previously that may be incorporated in any given multispectral camera design.

FIG. 23 shows one of many possible methods of incorporating the data in the additive color viewer indicated generally by the reference numeral 368. A film 370 shown in FIG. 23 and also in FIG. 23B is placed in the viewer in such a manner as to cooperate with condenser lenses 372, 374, 376 and 378 and four additional condenser lenses (not shown) behind those represented in FIG. 23. The condenser lenses respectively cooperate with projection lamps 380, 382, 384 and 386 to illuminate areas 388, 390, 392 and 294 of the format shown in FIG. 23B. Additional projection lamps (not shown) behind the ones shown in FIG. 23 cooperate with the additional condenser lenses (not shown) behind those shown in FIG. 23 to illuminate areas 396, 398, 400 and 402 shown in FIG. 23B. Desaturation lamps 404 and 406 cooperate with the projection lamps 380 and 384 by means of half-silvered mirrors 408 and 410. The lamps 404 and 406 are of adjustable intensity so that the projected images of the photographs 388 and 392 (and also the projected images of the photographs 398 and 402) can be selectively desaturated in accordance with conventional techniques of multispectral display.

Projection lenses 412, 414, 416 and 418 cooperate with the photographs 388, 398, 392 and 402, respectively, and with the condensers and projection lamps associated with those photographs to project them in superimposed relation on a viewing screen 420 for observation by an observer from a point 422. The points A, B, C and D shown in the film 370 in FIG. 23 and FIG. 23B are projected on the screen 420 in the relationship shown, the points A and C being coincident and the points B and D being coincident. The center points E and F of the photographs 388 and 392 are also coincident on the viewing screen 420. Normally, three photographs are projected simultaneously, the third photograph being, for example, the photograph 398 (FIG. 23B), which is projected by the lens 414. Its image is accurately superimposed on the other two images on the viewing screen 420. The fiducials 424, 424a, and 424b facilitate the accurate alignment of the projected images. When the projected image of each of the fiducials 424 is superimposed on a projected image of a corresponding fiducial 424a, the photographs 338 and 398 are accurately superimposed. The fiducials 424b and 424c are similarly employed to effect register of the images of the photographs 392 and 402, if both are projected.

The step wedges are projected by fiber optics bundles 426, 428, 430 and 432, shown in section in FIG. 23A. Two of these bundles, 428 and 432, are shown also in FIG. 23.

FIGS. 23C and 23D show one of the bundles, for example the bundle 428, which is divided into subgroups 428a, 428b, 428c and 428d, cooperating, respectively, with step wedges for the LAP, SRP, and LASRP and with the sensitometric step wedge.

Figure 25:
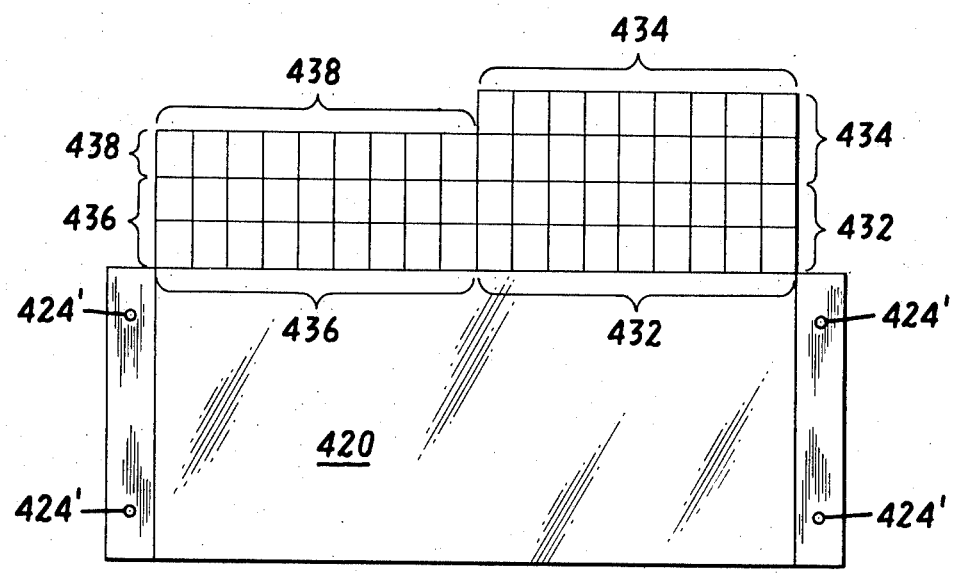
FIG. 25 is a schematic view in elevation of a representative presentation in accordance with the invention on a viewer screen, showing step wedges imaged in superimposition above the viewing screen.

The fiber optics bundles lead to the top of the viewer screen 420 and their exits are imaged by arrays of inexpensive lenses 430 to fom superimposed images 432, 434, 436 and 438 (FIG. 25), the former three being superimposed images for the three projected photographs and the latter being the sensitometric wedge images. The fiducials 424, 424a, 424b, or such of them as correspond to the photographs that are projceted, are superimposed at 424' (FIG. 25). As explained above, this facilitates accurate register of the photographs. The step wedges need not be imaged with great precision, since the resolution requirements are quite low. Thus fiber optics devices that are relatively coarse and inexpensive can be employed.

Figure 24:
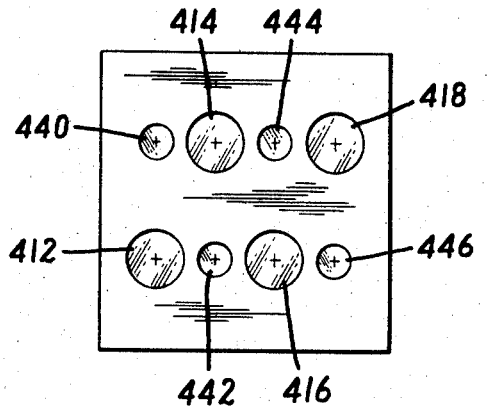
FIG. 24 is a schematic plan view of another embodiment of a portion of the apparatus of FIG. 23.

However, as FIG. 24 shows, it is also possible to employ in addition to the projection lenses 412, 414, 416, and 418 of FIG. 23 additional projection lenses 440, 442, 444 and 446 to project the step wedges, in which case the fiber optics need not be employed. Rather, the mirror 450 can be used to reflect not only the images of the photographs but also the images of the step wedges.

FIG. 25 shows only one of an indefinitely large number of presentations on the viewer screen. The step wedges can be imaged in superimposition in any desired arrangement about the periphery of the viewer screen.

Thus there are provided in accordance with the invention novel and highly effective methods and apparatus facilitating the automatic photographing and presentation of multispectral images greatly facilitating the speed and economy with which data can be gathered regarding a given scene. In accordance with the invention it is possible to distinguish between real and spurious indications in the photographed scene. Many modifications of the representative embodiments of the invention disclosed herein will readily occur to those skilled in the art. Accordingly, the invention is to be construed as including all of the embodiments thereof within the scope of the appended claims.

I claim:

1. A process of multispectral photography comprising the steps of forming, on black-and-white film and respectively employing differnet zones of the actinic electromagnetic spectrum, a plurality of photographs of a common scene overflown by an airplane or satellite or the like, the photographs each having an arbitrary spectral characteristic and illuminated by an illuminant of arbitrary spectral characteristic, adjusting the exposures respectively associated with said photographs so that each of said photographs is on a prescribed part of the characteristics curve of said film, simultaneously forming on said film, separately for each of said spectral zones, a first reference image having a density that is a function of the exposure adjustment for the associated spectral region, forming on said film a second reference image having a density that is a function of the intensity of the illuminant in the associated spectral region, and forming on said film a third reference image having a density that is a function of said exposure adjustment for the associated spectral region and of said intensity of the illuminant in the associated spectral region, projecting said photographs in superimposed relation to form a composite image for viewing, and adjusting the brightness of the respective projected photographs as a function of reference images.

2. A process according to claim 1 wherein said exposures are adjusted so that each of said photographs is on the same part of the characteristic curve of said film.

3. A process according to claim 1 wherein said exposures are adjusted so that each of said photographs is on the straight-line part of the characteristic curve of said film.

4. A process according to claim 1 wherein the forming of said records comprises the steps of forming on said film, separately for each of said spectral regions, a first reference image having a density that is a function of the exposure adjustment for the associated spectral region, forming on said film a second reference image having a density that is a function of the intensity of the illuminant in the associated spectral region, and forming on said film a third reference image having a density that is a function of said exposure adjustment for the associated spectral region and of said intensity of the illuminant in the associated spectral region.

5. A process according to claim 1 wherein the forming of said reference images and photographs is within the same camera, and further comprising the steps of providing illumination means within the camera for forming the said reference images on said film, employing said illumination means to form, separately for each of said spectral regions, first, second and third reference images, attenuating radiation from said illumination means employed in forming said first reference image in direct proportion to the brightness of the scene in the associated spectral region, attenuating radiation from said illumination means employed in forming said second reference image in inverse proportion to the brightness of the illuminant in the associated spectral region, and attenuating radiation from said illumination means employed in forming said third reference image in direct proportion to the algebraic sum of the attenuation of the radiation employed in forming said first reference image and the attenuation of the radiation employed in forming said second reference image.

6. A process of multispectral photography comprising the steps of taking a plurality of photographs of a common scene overflown by an airplane or satellite or the like, said photographs being taken simultaneously on black-and-white film in a plurality of different zones of the actinic electromagnetic spectrum, the exposures of the several photographs being such that each photograph is formed on the straight-line part of the characteristic curve of the film;

forming separate photographic reference images corresponding to each of the said photographs, each reference image being a function both of the intensity of the incident solar illuminant and the intensity of the radiation from the scene;

projecting the photographs after development in superimposed relation and respectively in the same zones of the spectrum to form a composite image;

projecting said separate reference images in superimposed relation and respectively in the same zones of the spectrum to form a composite reference image; and adjusting the projection intensities of the respective photographs and reference images to make the composite of the projected reference images white.

References Cited
UNITED STATES PATENTS

| | | | |
|---|---|---|---|
| 2,322,044 | 6/1943 | McFarlane et al. | 96—27 R |
| 2,553,285 | 5/1951 | Thomas | 355—37 |
| 3,085,469 | 4/1963 | Carlson | 355—37 |

OTHER REFERENCES

Kodak Color Data Book, "Color Photography in the Studio"; 1950, Eastman Kodak Company, p. 64, paragraphs 2–5.

J. TRAVIS BROWN, Primary Examiner

A. T. SURO PICÓ, Assistant Examiner

U.S. Cl. X.R.

95—12

UNITED STATES PATENT OFFICE
CERTIFICATE OF CORRECTION

Patent No. 3,700,438     Dated October 24, 1972

Inventor(s) EDWARD F. YOST, JR.

It is certified that error appears in the above-identified patent and that said Letters Patent are hereby corrected as shown below:

Column 1, line 36 — "simultantously" changed to --simultaneously--;
Column 2, line 10 — "sveral" changed to --several--;
Column 2, line 16 — "measure" changed to --measurement--;
Column 6, line 42 — "21-1r" changed to -- 32-1r --;
Column 8, line 65 — "througfh" changed to --through--;
Column 10, line 67 — --a-- inserted before "particular" (first occurrence)
Column 11, line 34 — "dealt" changed to --delta--;
Column 12, line 21 — "SARP" changed to --SRP--;
Column 13, line 20 — "Y" changed to --y--;
Column 14, line 11 — "Fig. 16" changed to --Fig. 15--;
Column 14, line 31 — "321" changed to --312--;
Column 15, line 17 — "294" changed to --394--;
Column 15, line 49 — "338" changed to --388--;
Column 15, line 65 — "fom" changed to --form--;
Column 16, line 31 — "differnet" changed to --different--;
Column 16, line 39 — "characteristics" changed to --characteristic--.

Signed and sealed this 8th day of May 1973.

(SEAL)
Attest:

EDWARD M. FLETCHER, JR.
Attesting Officer

ROBERT GOTTSCHALK
Commissioner of Patents